United States Patent
Gershaneck et al.

(10) Patent No.: US 11,301,432 B2
(45) Date of Patent: Apr. 12, 2022

(54) FAST RECALL FOR GEOGRAPHICALLY DISTRIBUTED OBJECT DATA

(71) Applicant: Hitachi Vantara LLC, Santa Clara, CA (US)

(72) Inventors: Nate Gershaneck, Santa Clara, CA (US); Clay Curry, Santa Clara, CA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 90 days.

(21) Appl. No.: 16/484,476

(22) PCT Filed: Jun. 8, 2017

(86) PCT No.: PCT/US2017/036474
§ 371 (c)(1),
(2) Date: Aug. 8, 2019

(87) PCT Pub. No.: WO2018/226227
PCT Pub. Date: Dec. 13, 2018

(65) Prior Publication Data
US 2020/0034339 A1    Jan. 30, 2020

(51) Int. Cl.
*G06F 16/182* (2019.01)
*G06F 16/16* (2019.01)
(Continued)

(52) U.S. Cl.
CPC .......... *G06F 16/182* (2019.01); *G06F 16/125* (2019.01); *G06F 16/137* (2019.01); *G06F 16/162* (2019.01); *G06F 16/172* (2019.01)

(58) Field of Classification Search
CPC .... G06F 16/182; G06F 16/162; G06F 16/125; G06F 16/137; G06F 16/172
See application file for complete search history.

(56) References Cited

U.S. PATENT DOCUMENTS 9,063,946 B1     6/2015   Barber et al.
9,501,426 B1 *  11/2016   Hendry ................. G06F 12/121
(Continued)

OTHER PUBLICATIONS

Extended European Search Report issued in corresponding European Application No. 17912960.6 dated Oct. 20, 2020.
(Continued)

*Primary Examiner* — Huawen A Peng
(74) *Attorney, Agent, or Firm* — Mattingly & Malur, PC

(57) ABSTRACT

In some examples, a computer system may receive a data object including object data. For example, the system may be one of three or more systems located at different respective geographic locations. The system may determine a plurality of chunks by dividing the object data into a plurality of data chunks based on a total number of the systems and determining a parity chunk. The system may send some of the chunks to the other systems, while maintaining a complete instance of the object data at the first system. The system may associate a time with the object data based on receiving the data object. Additionally, the system may associate a time threshold with the complete instance of the object data. For example, the time threshold may indicate a time at which the complete instance of the object data is to be deleted from the system.

20 Claims, 14 Drawing Sheets

(51) Int. Cl.
    *G06F 16/11*     (2019.01)
    *G06F 16/13*     (2019.01)
    *G06F 16/172*     (2019.01)

(56) References Cited

U.S. PATENT DOCUMENTS

| | | | |
|---|---|---|---|
| 9,866,634 B1* | 1/2018 | Choy | G06F 16/1824 |
| 10,210,187 B2* | 2/2019 | Dietterich | G06F 16/215 |
| 10,853,350 B1* | 12/2020 | Sharifi Mehr | H04L 63/10 |
| 2008/0276234 A1 | 11/2008 | Taylor et al. | |
| 2010/0241654 A1* | 9/2010 | Wu | G06F 16/188 |
| | | | 707/769 |
| 2013/0067025 A1 | 3/2013 | Vasters | |
| 2013/0212070 A1 | 8/2013 | Saika et al. | |
| 2013/0227285 A1* | 8/2013 | Bracher | G06F 21/6218 |
| | | | 713/168 |
| 2013/0339818 A1 | 12/2013 | Baker et al. | |
| 2014/0201797 A1 | 7/2014 | Kim et al. | |
| 2015/0134619 A1 | 5/2015 | Factor et al. | |
| 2016/0378624 A1 | 12/2016 | Jenkins, Jr. et al. | |
| 2017/0060897 A1* | 3/2017 | Madaan | G06F 21/6281 |
| 2018/0253357 A1* | 9/2018 | Varley | G06F 11/1004 |

OTHER PUBLICATIONS

International Search Report of PCT/US2017/036474 dated Sep. 1, 2017.

Office Action issued in corresponding European Application No. 17912960.6 dated Jan. 24, 2022.

\* cited by examiner

US 11,301,432 B2

FAST RECALL FOR GEOGRAPHICALLY DISTRIBUTED OBJECT DATA

TECHNICAL FIELD

This disclosure relates to the technical field of storing, protecting, and retrieving data.

BACKGROUND

Data objects may be stored in an object storage architecture that manages data as objects. Each object typically includes the object data (e.g., the data content), metadata that describes the object data, and a globally distinguishable identifier. In some situations, stored object data may be erasure coded to provide redundancy protection against the loss of the data. Erasure coding may include dividing the data into a plurality of data chunks. Parity data is encoded for the data chunks, and the data chunks and the parity data may be stored across a set of different storage locations, such as on different storage mediums and/or at different geographic locations. If a data chunk of the object data at one of the storage locations becomes corrupted, destroyed, or is otherwise unavailable, the object data may still be reconstructed by using the remaining data chunks and the parity data that is stored at another one of the storage locations.

SUMMARY

Some implementations include a distributed topology of systems able to store chunks for data objects. For instance, a computer system may receive a data object including object data. For example, the system may be one of three or more systems located at different respective geographic locations. The system may determine a plurality of chunks by dividing the object data into a plurality of data chunks based on a total number of the systems and determining a parity chunk. The system may send some of the chunks to the other systems, while maintaining a complete instance of the object data at the first system. The system may associate a time with the object data based on receiving the data object. Additionally, the system may associate a time threshold with the complete instance of the object data. For example, the time threshold may indicate a time at which the complete instance of the object data is to be replaced by an object chunk (e.g., data chunk or parity chunk) and deleted from the system.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION OF THE EMBODIMENTS

Figure 1:
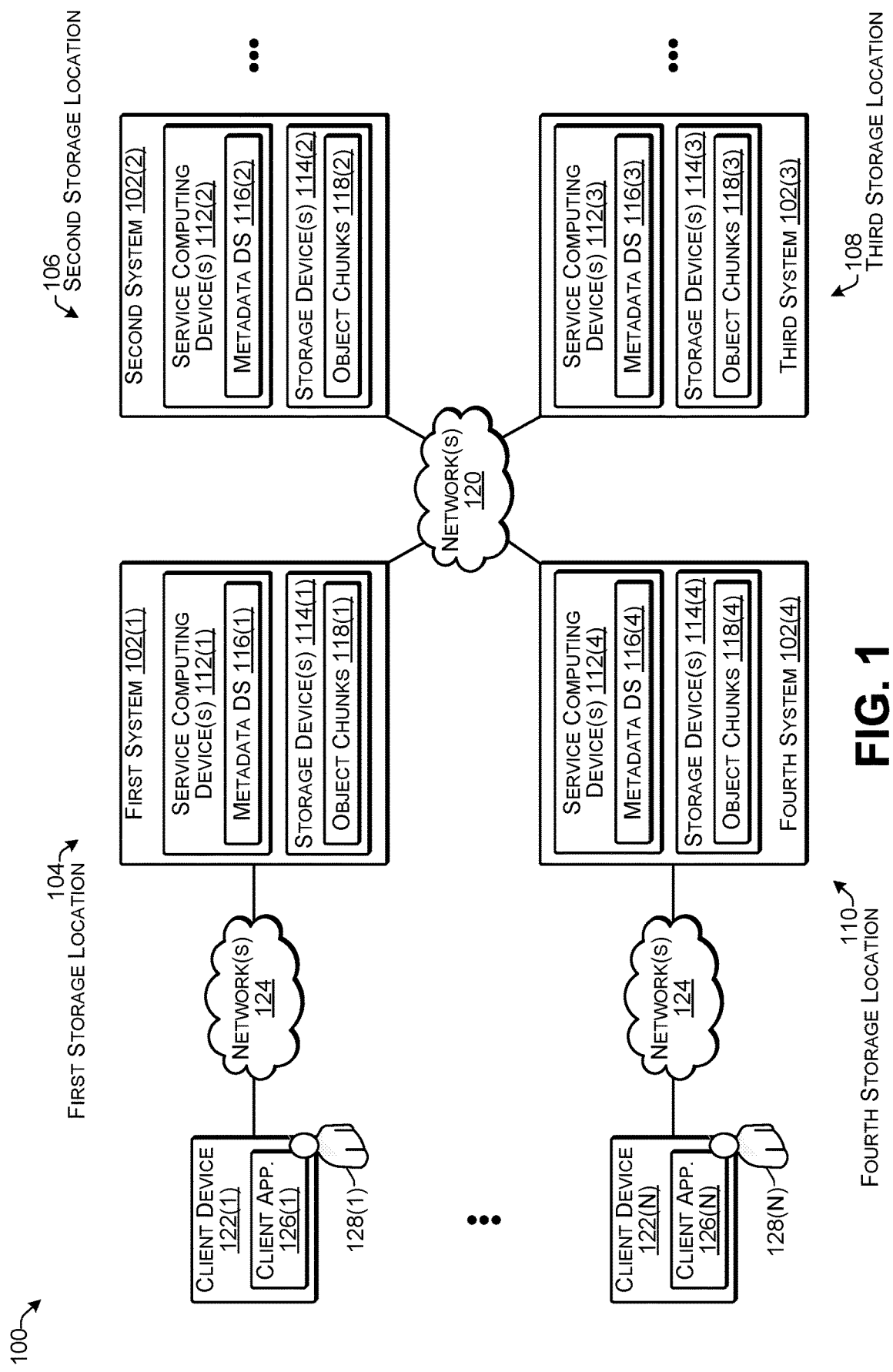
FIG. 1 illustrates an example architecture of a system for storing, protecting, and reconstructing data objects according to some implementations.

Some implementations herein include techniques and arrangements for improving object data recall performance for erasure coding object storage systems in a geographically distributed topology of storage locations. As one example, the systems herein may achieve improved object recall times by being temporally and geographically aware of certain data objects that are likely to be accessed based on tracking the time and location of accesses to object data. When a user sends a request to access an object to one of the systems in the distributed topology, if a complete instance of the object data does not already exist at that system, the system may obtain object chunks for the object from other ones of the systems and may construct a complete instance of object data for responding to the request for accessing the object.

Based on the access request, the system may set a time of last access in an entry in a last access data structure that is associated with the complete instance of the object data. A time threshold may be set or may be otherwise associated with the complete instance of the object data, such as based on the entry in the last access data structure. Thus, the system may maintain the complete instance of the object data until the time threshold is reached or otherwise expires. When the time threshold expires, the system may reduce the complete instance of the object data to an object chunk (i.e., a data chunk or parity chunk) that the particular system is responsible for maintaining.

In some examples, there may be one or more default time thresholds set for use by the system or by all of the systems in the distributed topology. In other examples, an administrator or other user may configure the duration of the time thresholds to be different at different ones of the systems, different for different objects, such as based on different object types, or based on other considerations, such as an amount of available storage at each system. Thus, the time threshold may be determined based on temporally proximate and geographically proximate timing considerations, available unused storage capacity, typical usage patterns at individual ones of the systems, typical usage patterns for a particular entity that maintains the data, and so forth. When the time threshold expires following the last access to the object by a client, the complete instance of the object data at that system may be reduced to an erasure-coded chunk and the complete instance may be deleted or otherwise marked for deletion to free up the storage space that the complete instance of the object data is occupying.

Each independent system in the distributed topology herein may maintain its own data structure or other metadata for tracking objects that are accessed, and may use this metadata to anticipate a likelihood that particular object data will be accessed. Based on this likelihood, an individual system may maintain a complete instance of the object data at that storage location for a threshold time so that users of the system at that storage location will be able to quickly retrieve the object.

Examples herein employ data management techniques that take advantage of a temporal proximity between sequential references to the same data object. For example, based on an assumption that a recently accessed object is likely to be accessed again in the near future, the system herein is configured to retain a recently accessed object for a threshold time period. In addition, in the geographically distributed topology herein, the system may be further configured to maintain the complete object data for a recently accessed object based on an assumption that an object that is accessed a particular storage location is more likely to be accessed again at that storage location than at others of the storage locations. In examples herein, an object may be considered to be accessed by a client either when the object is uploaded to the system, or when the object data or any part of the object is retrieved from the system by a client.

Some examples herein provide distributed object storage that uses geographically distributed erasure coding. The object data stored in the distributed topology herein may be divided into chunks, and the chunks may be dispersed across the distributed topology. The distributed topology herein may include a fixed number of systems able to store the chunks, each located at a different geographic storage location. When the object data is reduced to erasure coded data chunks, the object data may be reduced to the same number of chunks (including a parity chunk) as there are storage locations/systems in the topology, and therefore, each system in the topology may store exactly one of the chunks of each object. Thus, the chunks of an object may be distributed across the fixed number of systems at geographically disperse storage locations, such that each system receives and maintains either one of the data chunks of the object or a parity chunk determined from the data chunks. Accordingly, the object storage techniques herein may protect against data loss resulting from a complete loss of a system at one of the storage locations, and further, provide that protection while consuming a smaller amount of storage than, for example, would be consumed by storing a full copy of the object data. When a user sends a request for access to an object to one of the systems, the system may retrieve some number of object chunks from the other distributed systems and may reconstruct the object data from the chunks. The object data and corresponding metadata may then be sent to the user in response to the request.

The last access data structure and time thresholds herein may be used to balance the conflicting requirements of storage performance, data protection, and storage cost. Storage is expensive, and the amount of data being stored is growing at rates never seen before. An entity that requires petabytes or more of storage and also requires data protection such that the entity can withstand the failure or complete loss of a storage location may employ the geographically distributed topology for storing erasure coded object data described herein. The distributed topology herein uses erasure coding to enable the entity to protect its data from the loss of a storage location at a much lower cost than full-copy replication.

Furthermore, implementations herein provide a technical solution to address a computer storage problem that is inherent to geographically distribute erasure coding object storage. In particular, such systems may be slow to retrieve and return data that exists only in chunked form and that is distributed across multiple storage locations. For example, retrieving chunks from remote storage locations may involve transmitting large amounts of data over great distances on highly latent wide-area networks, and a local system is not able to fully reconstruct the object data until all of the requested chunks have been returned. As a result, retrieving object data from a distributed topology may be slower than retrieving object data from an object storage system that does not use erasure coding and that only stores data at a single storage location. Accordingly, implementations herein provide a solution to this problem by anticipating where and when object data of particular objects is likely to be accessed and keeping a complete instance of the object data for those objects at a particular storage location for a threshold time window such that users are able to quickly access and retrieve selected ones of the objects.

For discussion purposes, some example implementations are described in the environment of a plurality of geographically distributed systems in communication with each other for storing and retrieving erasure coded object data. However, implementations herein are not limited to the particular examples provided, and may be extended to other types of computing and storage system architectures, other types of storage environments, other types of client configurations, other types of data, and so forth, as will be apparent to those of skill in the art in light of the disclosure herein.

FIG. 1 illustrates an example architecture of a distributed storage topography 100 configured for storing and retrieving objects according to some implementations. A plurality of systems 102 are arranged in the distributed topology at a plurality of respective storage locations 104-110. For example a first system 102(1) is located at a first storage location 104; a second system 102(2) is located at a second storage location 106; a third system 102(3) is located at a third storage location 108; and a fourth system 102(4) is located at a fourth storage location 110. Furthermore, while four systems and storage locations are illustrated in this example, the number of systems and storage locations in other examples is not limited to four, and may be three or more systems, such as ranging between 3 and 300 systems.

Each system 102 may include at least one service computing device 112 and at least one storage device 114. Accordingly, one or more service computing devices 112(1) and one or more storage devices 114(1) may be included in the first system 102(1); one or more service computing devices 112(2) and one or more storage devices 114(2) may be included in the second system 102(2); one or more service computing devices 112(3) and one or more storage devices 114(3) may be included in the third system 102(3); and one or more service computing devices 112(4) and one or more storage devices 114(4) may be included in the fourth system 102(4). Furthermore, while the service computing device(s) 112 and the storage device(s) 114 are illustrated separately in this example, in other examples, the storage device(s) 114 may be incorporated into or otherwise included in the service computing devices(s) 112, as discussed additionally below. Further, the systems 102 are not limited to the hardware configurations described and illustrated in this disclosure, but may include any suitable or desired hardware configuration able to serve as object storage and perform the functions described herein, and the hardware configuration at one of the systems 102 may be different from that at another one of the systems 102.

At least one service computing device 112 in each system 102(1)-102(4) includes, maintains, or otherwise accesses a metadata data structure 116 that is used to store metadata about a plurality of object chunks 118 that are stored on the storage device(s) 114 at the respective systems 102(1)-102 (4). For example, the metadata data structure 116 may be a database, a table, or any other suitable data structure. The metadata included in the metadata data structure 116 may include information about each object and/or a corresponding object chunk, such as path, name, owner, hash value determined from the object data, and so forth.

The systems 102(1)-102(4) are able to communicate with each other over one or more networks 120. The one or more networks 120 may include any suitable network, including a wide area network, such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 120 may include both wired and/or wireless communication technologies. Components used for such communications can depend at least in part upon the type of network, the environment selected, or both. Protocols for communicating over such networks are well known and will not be discussed herein in detail. Accordingly, the service computing devices 112 are able to communicate over the one or more networks 120 using wired or wireless connections, and combinations thereof.

In addition, at least some of the service computing devices 112 are able to communicate with client devices 122(1)-122 (N) through one or more networks 124. Each client device 122(1)-122(N) may include a respective instance of a client application 126(1)-126(N) that may execute on the respective client device 122(1)-122(N), such as for communicating with a respective service computing device 112, e.g., for sending data objects for storage on the systems 102 and/or for receiving stored objects from the systems 102. In some cases, the application 126 may include a browser or may operate through a browser, while in other cases, the application 126 may include any other type of application having communication functionality enabling communication with the service computing devices 112 over the one or more networks 124.

The one or more networks 124 may be a LAN in some examples. In other examples, the one or more networks 124 may be any of the networks discussed above with respect to the one or more networks 120. In some cases, the users 128 and/or the client devices 112 or client applications 126 may be assigned to access the service computing device(s) 112 at a particular storage location of the plurality of storage locations 104-110. For example, if the storage location 104 is located in Boston, and the user 128(1) is an employee who works in the Boston area, the user 128(1) may be assigned to access the service computing device(s) 112(1), rather than the other service computing devices 112(2)-112(4) at the other storage locations 106-110, respectively. As one example, various users 128 or groups of users may only be granted access to certain ones of the service computing device(s) 112 at certain ones of the storage locations 104-110, such as for load balancing, limiting employee access to the local office system, and so forth. Furthermore, while four systems 102(1)-102(4) and storage locations 104-110 are shown in this example, in other examples, a different number of systems/storage locations may be used, such as three or more, with the upper limit being based on practically and diminishing returns, rather technical feasibility.

Figure 2:
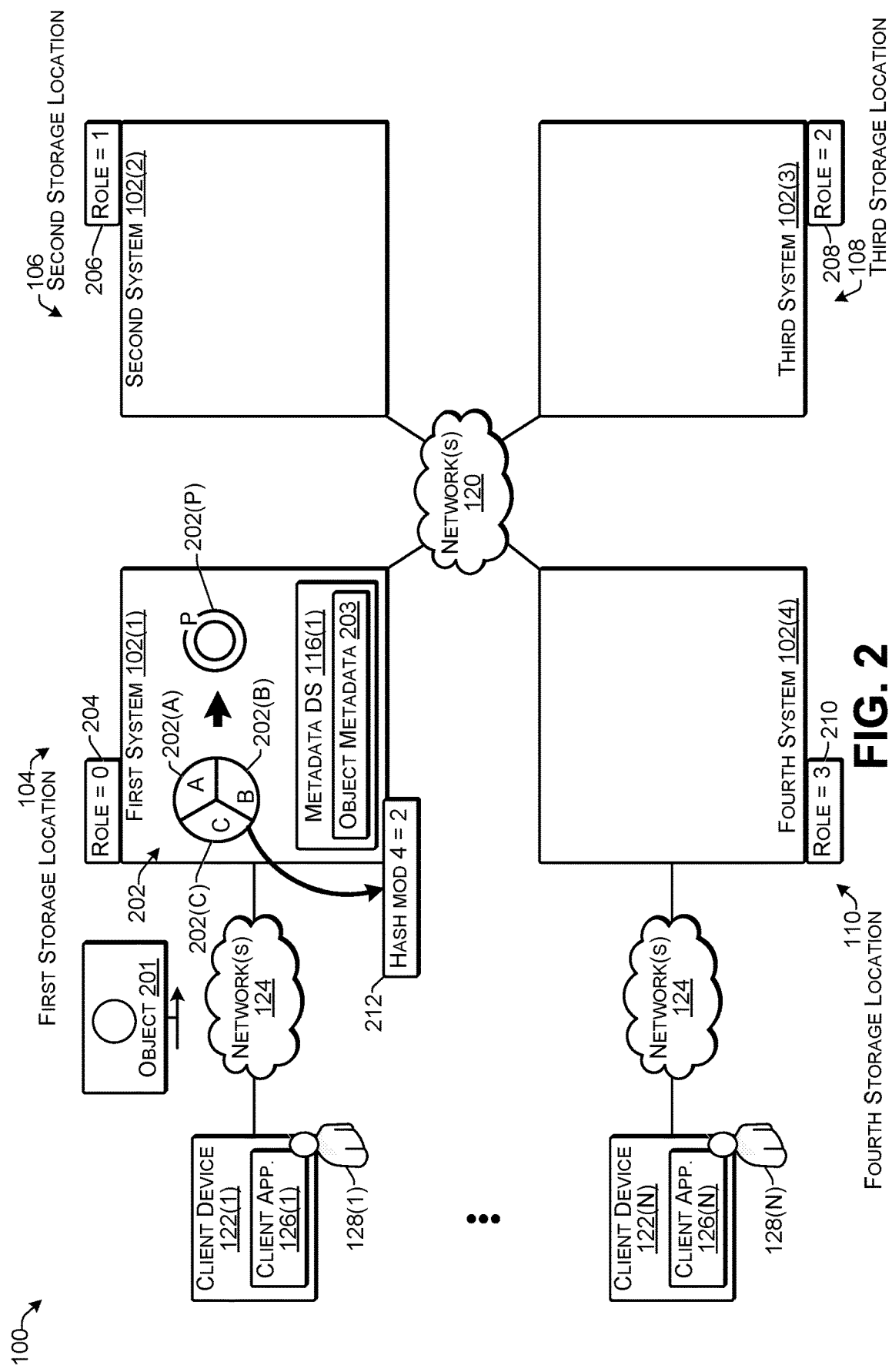
FIG. 2 illustrates an example of dividing an object into data chunks and determining a parity chunk according to some implementations.

FIG. 2 illustrates an example of dividing an object into data chunks and determining a parity chunk according to some implementations. In this example, suppose that the user 128(1) sends an object 201 to the first system 102(1). The first system 102(1) receives the object 201 from the client device 122(1). For example, the object 201 may include object data 202 and object metadata 203. The object metadata 203 may include an object identifier, an object type, object size, object owner, creation date, and so forth, as mentioned above. In the examples herein, "object data" may refer exclusively to an object's data content and may exclude the object metadata. Similarly, the object metadata may exclude the object data.

In the illustrated example, for purposes of distributing data chunks among the systems 102 in the distributed topology 100, the first system 102(1) has a role value equal to 0, as indicated at 204; the second system 102(2) has a role value equal to 1, as indicated at 206; the third system 102(3) has a role value equal to 2, as indicated at 208; and the fourth system 102(4) as a role value equal to 3 as indicated at 210. These role values may be assigned by a system administrator or through other techniques, but typically will remain constant for the topology 100 to enable systems 102 to determine where chunks are located within the distributed topology, as discussed additionally below.

Further, the object data may be divided into a number of chunks based on the number of different storage locations. For example, if there are M storage locations/systems, the object data may be divided into M−1 data chunks, and one parity chunk may be generated for the M−1 data chunks so that the total number of chunks is equal to the total number of systems in the distributed topology. Thus, in the illustrated example, the first system 102(1) divides the object data 202 of the object 201 into three approximately equally sized object data chunks, i.e., data chunk 202(A), data chunk 202(B), and data chunk 202(C). In some cases, each chunk 202(A)-202(C) may contain contiguous bytes from the original object data 202. As one simple example, if a 999 byte file is divided into three chunks, chunk 202(A) may contain bytes 0-332, chunk 202(B) may contain bytes 333-665, and chunk 202(C) may contain bytes 666-998. To reconstruct the original object data from the three data chunks 202(A)-202 (C), the first system 102(1) (or another one of the systems 102) may simply concatenate chunks 202(A)+202(B)+202 (C). Accordingly, reconstructing complete object data from a plurality of data chunks may incur a very low computational overhead. An alternative technique for dividing the object data into chunks is discussed below with respect to FIG. 11.

The first system 102(1) may use the data chunks 202(A)-202(C) to compute a parity chunk 202(P). The parity chunk 202(P) may typically be approximately the same size as an individual one of the data chunks 202(A)-202(C). Accordingly, in the illustrated example including four storage locations, the parity chunk 202(P) and any two of the data chunks 202(A)-202(C) may be used to compute object data of the remaining data chunk. This is achieved by applying a mathematical formula. As a simplified example, consider the following equation: A+B+C=P. Given values for A, B, and C, it is possible to compute the parity P, for example 2+3+4=P, therefore P=9. If any single value is lost, it can be computed using the known values and the parity, 2+B+4=9, therefore B=3. As one example, as is known in the art, parity data may be computed for the data chunks 202(A)-202(C) using an exclusive OR function (XOR) for determining the parity data. Consequently, if one of the data chunks 202(A), 202(B), or 202(C) is unavailable, the object data 202 may still be reconstructed using the parity chunk 202(P) and the other two data chunks.

The first system 102(1) may further compute a hash value from the object data 202 that is representative of the data content. The system 102(1) may use any of a number of well-known deterministic hash algorithms such as the SHA-256 algorithm, the MD5 algorithm, or the like. For instance, when the deterministic hashing algorithm is applied to the object data, the result is a hash value (i.e., a "hash") that is representative of the data content of the object data. Due to the nature of the hash algorithms used, it is extremely unlikely that applying these hashing algorithms to any two sets of data with different content would result in the same hash value. Further, applying these hashing algorithms to any two sets of data with identical content is guaranteed to result in the same hash value (i.e., the hash algorithms are deterministic and provide a result based on the content to which the algorithm is applied).

After the hash value for the object data has been computed, the hash value may be used for determining, for each chunk, a target system in the distributed topology. For example, based on the hash value, a mapping may be determined for each chunk to a respective one of the systems in the distributed topology. The mapping technique may be consistent such that for the same hash value, the chunks are distributed to the same systems/storage locations. As one example, a modulo operation may be applied for determining the corresponding system location for each chunk. For example, in a distributed topology with four different storage locations, the system that receives the object and distributes the chunks may compute the hash value and apply modulo (4) to the hash value, where the modulo value applied is equal to the number of separate systems in the distributed topology. Thus, as indicated at 212, the first system 102(1) may compute the modulo(4) of the hash value determined using the hash algorithm. The result of this computation will always be an integer ranging from 0 to 3. For example, since there are four systems 102(1)-102(4), modulo(4) is used; if there were five systems, modulo(5) may be used; if there were six systems, modulo (6) may be used, and so forth.

The result of the modulo operation may be used to determine which storage location is assigned for storing the first chunk of the erasure coded object data. As an example, the first data chunk of the object data may be stored at the system having a role value that matches the result of the modulo operation. Each subsequent data chunk of the object may be stored at each subsequent storage location with the next highest role number using a round robin distribution, and the parity chunk may be stored last in the sequence. If there are no storage locations with a higher role value, then the next chunk is stored at the system with role value=0.

Furthermore, using the formula "hash value modulo(number of systems)" and placing the first data chunk at the system matching the result is not the only way to consistently distribute the chunks herein. For example, the system may start a delivery sequence with any of the data chunks and not necessarily the first data chunk, may start with the parity chunk, may distribute the chunks in a descending order of role values, rather than ascending order, and so forth. Additionally, rather than using the modulo of the number of systems, the modulo may be determined using the number of possible permutations for placement of the chunks, or the like. Numerous other variations will be apparent to those of skill in the art having the benefit of the disclosure herein.

In this example, suppose that the hash value mod(4) is equal to 2, as indicated at 212. This means that the storage location having the assigned storage role value=2 in the distributed topology (i.e., third system 102(3) in the illustrated example) is responsible for storing chunk 202(A) of the object data of object 201. Each subsequent chunk, with the parity chunk being the last in the sequence, may be stored on each subsequent system 102 with the next highest role value, respectively. If there are no systems with a higher role value then the next chunk is stored on the storage system with role value=0. Thus, the first system 102(1) may reduce the object data to the data chunks 202(A)-202(C) and the parity chunk 202(P), and transmit the chunks over the one or more networks 120 to the other systems 102(2), 102(3), and 102(4) based on correspondence with the assigned role values of the systems.

By using the distribution technique discussed above, rather than having each system in the distributed topology have a fixed chunk responsibility, the respective systems in the distributed topology herein have dynamic chunk responsibilities. As a result, each system may be responsible for storing any number of data chunks or parity chunks. The hashing algorithm may return hash values that are adequately random to ensure an even distribution of parity chunks across all the systems in the distributed topology. Thus, no one system in the distributed topology is likely to have a much larger percentage of parity chunks than the other systems, thereby more evenly distributing the computing burden when the data objects are reconstructed using a parity chunk in place of a data chunk. Furthermore, in the example herein, in which there are four systems, the amount of storage used to provide data protection is 1.33 times the original object data size, a significant savings over 2 times the size that would be used by storing a full copy of the object data.

Figure 3:
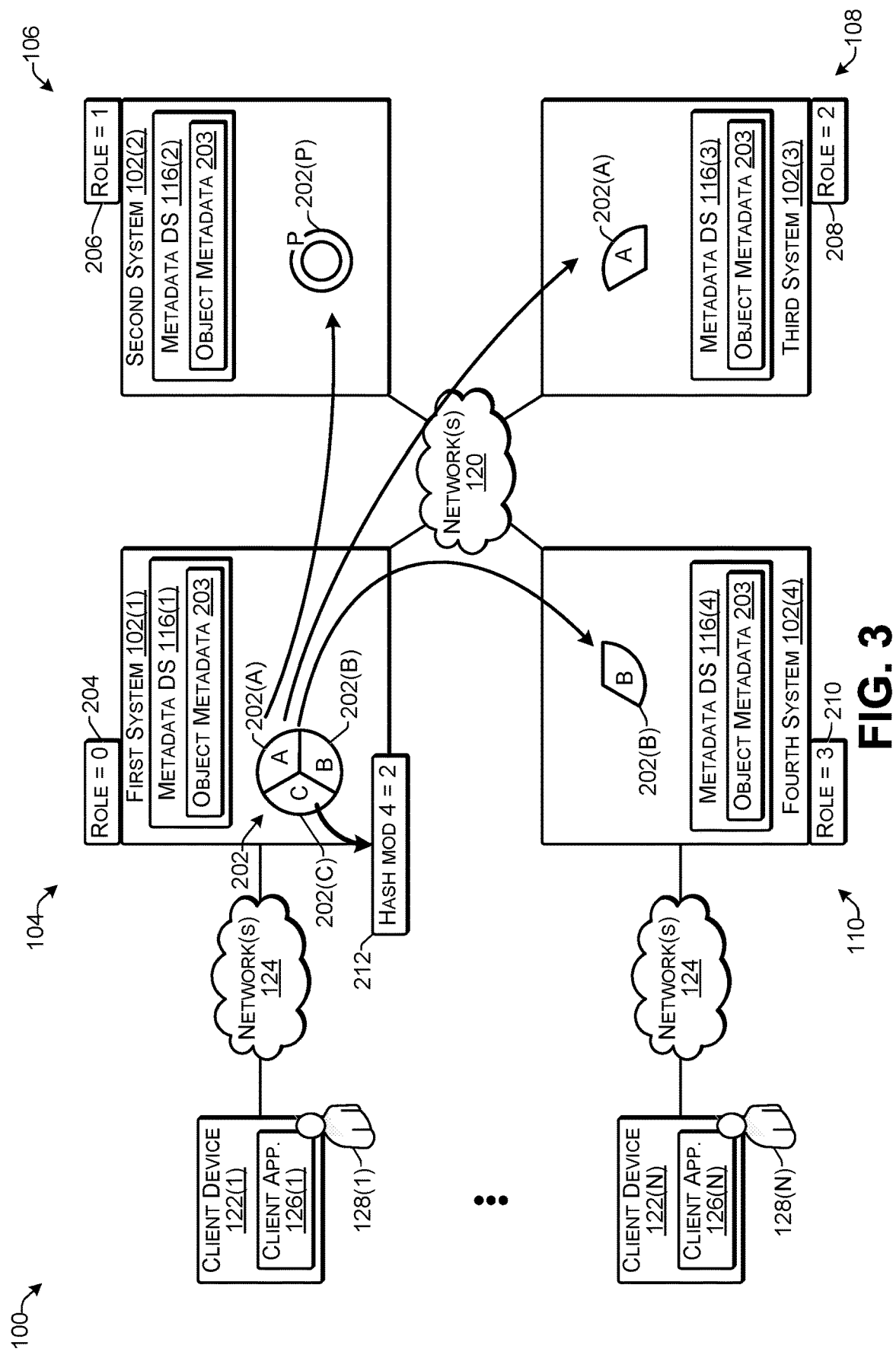
FIG. 3 illustrates an example of geographically distributing object chunks according to some implementations.

FIG. 3 illustrates an example of geographically distributing object chunks according to some implementations. After reducing the object data to the data chunks 202(A), 202(B), and 202(C), and the parity chunk 202(P), individual ones of the chunks may be sent to separate ones of the systems 102(2)-102(4) in the system topology 100 according to the distribution mapping technique discussed above. As mentioned above, each system 102 may store a single one of the object chunks 202(A), 202(B), 202(C), or 202(P) based on the mapping function determined from the hash of the object data and the assigned role values assigned to each of the systems 102(1)-102(4) at the respective storage locations 104-110. In addition, when each object chunk is sent to the other systems 102(2)-102(4), the sending system 102(1) may also send the object metadata 203 associated with the object 201 and the particular chunk. The object metadata 203 send to each system 102(2)-102(4) may include the types of object metadata described above and also the hash value determined for the complete object data 202.

In this example, the modulo(4) of the hash value is equal to 2, which corresponds to the role value assigned to the third system 102(3), as indicated at 208. Accordingly, the first system 102(1) sends the first data chunk 202(A) of the object data to the third system 102(3), and distributes the remaining chunks of the object in sequence according to increasing role values until there is no higher role value, at which point the first system 102(1) continues distribution starting at role 0. Therefore, based on this technique the fourth system 102(4) having a role value equal to 3, receives the second chunk 202(B); the first system 102(1) having a role value equal to 0 retains or otherwise receives the third data chunk 202(C), and the second system 102(2) having a role value equal to 1 receives the parity chunk 202(P).

The object metadata 203 may be sent with the respective object chunks, or separately therefrom. The respective systems receive the metadata 203 and store it in their respective metadata data structures 116 in association with the received object chunk. Furthermore, while using "hash value modulo (4)" is described herein as one technique for establishing consistent mapping between the data chunks and the plurality of systems 102 based on the content of the object data, various other mapping techniques will be apparent to those of skill in the art having the benefit of the disclosure herein. Accordingly, implementations herein are not limited to the particular technique described.

Figure 4:
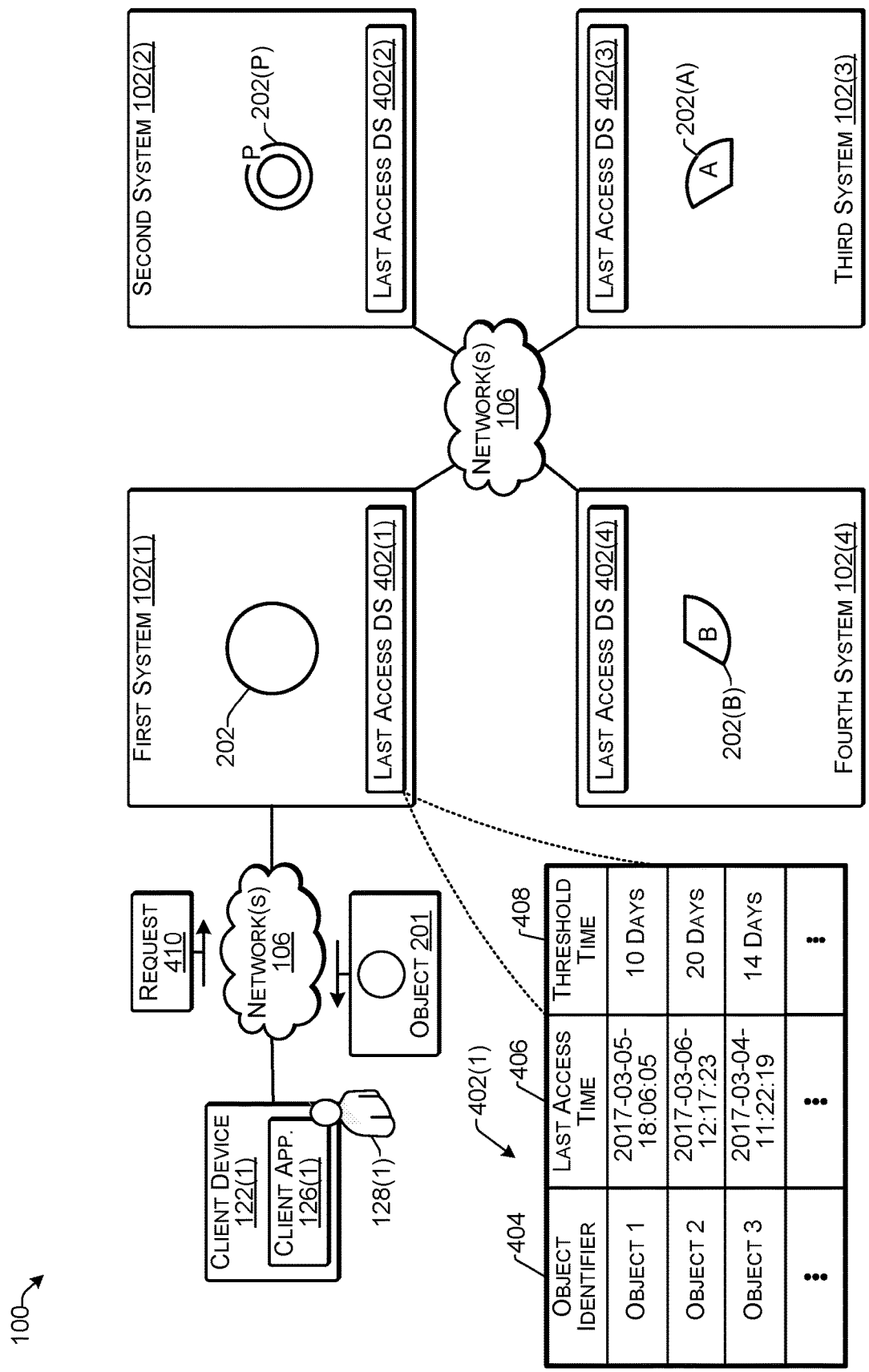
FIG. 4 illustrates an example of a last access data structure employed for managing data according to some implementations.

FIG. 4 illustrates an example of maintaining a complete instance of object data based on a last access data structure according to some implementations. In this example, the first system 102 1 retains a complete instance of the object data 202 on the first system for a threshold time after a last access time. For example, in this case, the last access time for the object would be when the object was received from the client device 122(1), as discussed above with respect to FIG. 2. Each of the systems 102 may maintain a last access data structure 402 to keep track of the last access time for each object stored by the respective system and a corresponding time threshold. Accordingly, the first system 102(1) maintains a last access data structure 402(1); the second system 102(2) maintains a last access data structure 402(2); the third system 102(3) maintains a last access data structure 402(3); and the fourth system 102(4) maintains a last access data structure 402(4).

Each last access data structure 402 may include at least an object identifier 404, a last access time 406, and a threshold time 408. In some examples, the threshold time 408 may be a length of time (e.g., a number of days, weeks, etc.), while in other examples, the threshold time 408 may be a specific time (e.g., a specific date and time) at which the threshold expires. In some examples, the threshold time 408 may be the same for all objects in a system 102 and or for all objects in the distributed topology 100. However, in other examples, the threshold time 408 may be different in different ones of the systems 102 and/or for different objects within a particular system 102. As several examples, one of the systems may have more storage capacity than another one of the systems and therefore may be able to tolerate maintaining the complete instance of the object data for a longer period of time. As another example, some types of objects may be known to be accessed for particular time periods while other objects may be accessed more randomly. As one example, a classified ad that is associated with a two-week lifespan may have a 14 day threshold time associated with it since the ad may be likely to be accessed frequently during that 2 week span and would be accessed rarely after that time. On the other hand, a word processing document used by an employee of the company might be likely to be accessed frequently during the first few days after it is created and may be accessed only infrequently thereafter. Numerous other variations will be apparent to those of skill in the art having the benefit of the disclosure herein.

When the threshold time for a particular data object expires, the system may reduce the object data for that data object from a complete instance of the object data to the data chunk that the particular system is responsible for maintaining. Furthermore, when an access is made to the object, the last access time 406 may be reset to the latest access time for the particular object. In this example, suppose that the object data 202 corresponds to Object 1 in the last access data structure 402(1). The last access time for Object 1 is shown to be Mar. 5, 2017 at 6:06 PM. Furthermore, suppose that the current date is Mar. 13, 2017, at 5:00 PM, which means that the object data 202 will be reduced to a chunk in about two more days. However, suppose that the first user 128(1) at the client device 122(1) sends a request 410 to the first system to access the first object. Since the first system has a complete instance of the object data 202 already available, the first system may respond immediately to the request 410 by sending the object 201 including the object data 202 to the client device 122(1).

Furthermore, based on this accessed by the client device 122 1, to the object 201, the first system may update the last access data structure 402 1 by changing the last access time 406 for Object 1 to the current time (not shown in FIG. 4). Accordingly, in this example, the last access time is reset to the current time, which means that the first system 102(1) will maintain a complete instance of the object data 202 for the threshold time i.e. another 10 days. If there are no more accesses to the object during that time period, then the first system 102(1) will reduce the object data 202 to the data chunk 202(C) as discussed above and delete or otherwise mark for deletion the complete instance of the object data 202.

Figure 5:
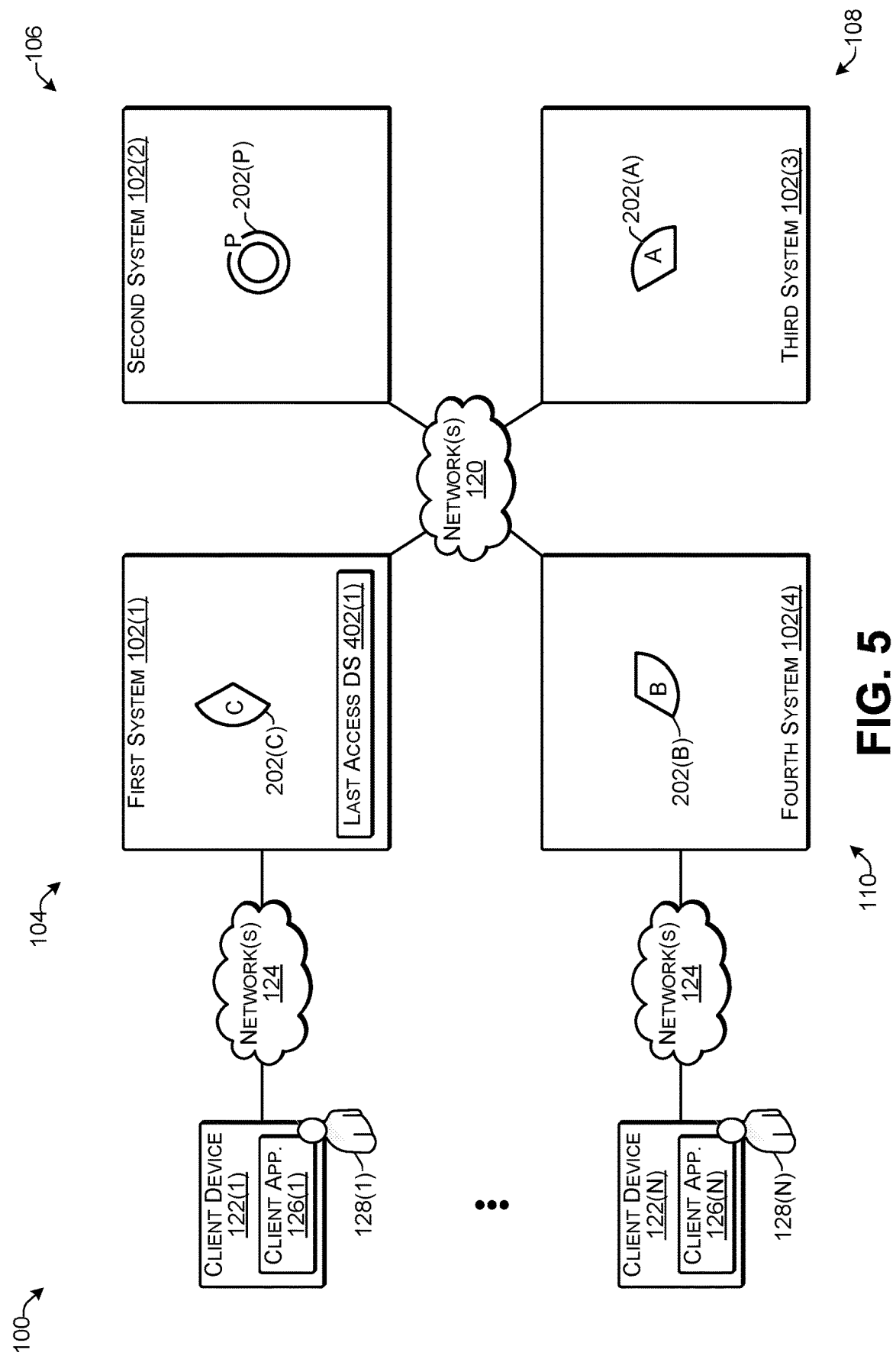
FIG. 5 illustrates an example of reducing object data following expiration of a time threshold according to some implementations.

FIG. 5 illustrates an example of reducing object data following expiration of a time threshold according to some implementations. In this example, suppose that the current date is now Mar. 23, 2017, at 5:00 PM, and further suppose that no more accesses to the first object have been made since the last access on Mar. 13, 2017, discussed above. Accordingly, the 10-day time threshold has expired and the first system 102(1) may determine to reduce the object data 202 to a data chunk. For instance, each of the systems 102 may include a storage manager program (discussed additionally below with respect to FIGS. 13 and 14) or the like, that periodically determines when to reduce complete copies of object data to a data chunk based on the information in the last access data structure.

In some examples, the first system 102 may have retained the data chunk 202(C) from when the other chunks 202(A), 202(B), and 202(P) were created and distributed to the other systems 102(2)-102(4) in the distributed topology. In other examples, the first system 102 may re-create the data chunk 202(C) when the complete instance of the data 202 is reduced and deleted from the first system 102(1). The overhead for re-creating the data chunk 202 C may be relatively small, and thus, not maintaining the data chunk 202(C) concurrently with the complete instance of the object data 202 saves some storage capacity from being wasted during the time that the complete instance of the object data 202 is maintained.

Additionally, in the case that the first system 102(1) is responsible for maintaining the parity chunk rather than one of the data chunks, in some examples, the first system 102(1) may maintain the parity chunk in storage while the complete instance of the object data 202 is also maintained in storage, rather than having to incur the computational overhead of recomputing the parity chunk when the complete instance of the object data 202 is reduced and deleted from the first system 102(1). Alternatively, of course, the first system 102(1) may recompute the parity chunk when the object data 202 is reduced, such as in the case that the object data 202 is very large and/or there is a limited amount of available storage capacity on the first system 102(1). Accordingly, FIG. 5 shows that the first system 102(1) now stores only the data chunk 202(C), and that the complete instance of the object data 202 has been deleted or otherwise marked for deletion.

Figure 6:
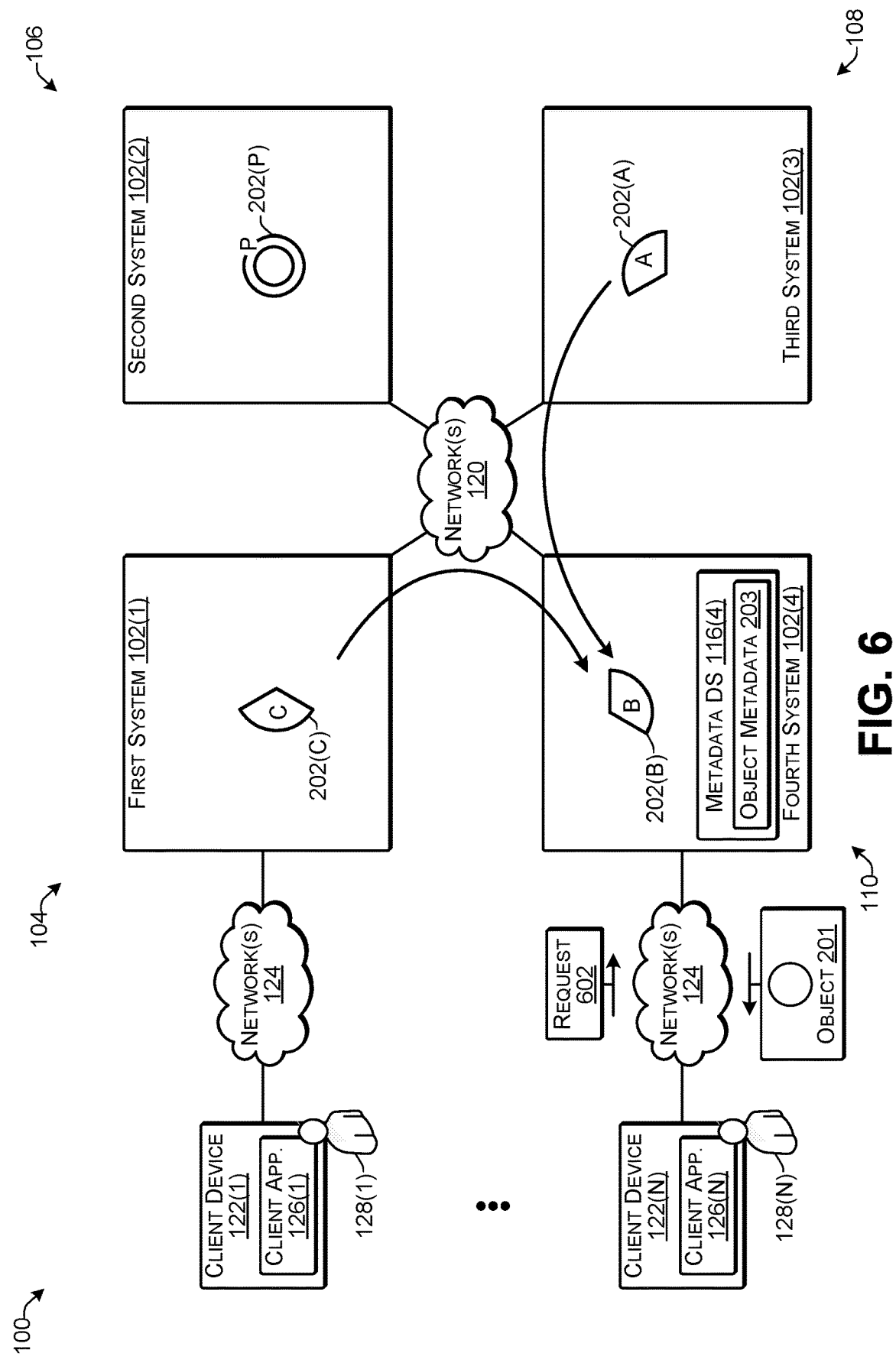
FIG. 6 illustrates an example of reconstructing object data from object chunks according to some implementations.

FIG. 6 illustrates an example of reconstructing an object from geographically distributed chunks according to some implementations. When a stored object is requested by a user 128 from one of the systems 102 in the distributed topology 100, the system 102 that receives the request may use a locally stored chunk plus two additional data chunks retrieved from other systems 102 at other respective storage locations to recreate the object data 202 from the chunks. To limit the network bandwidth consumed by this activity, the reconstructing system 102 may retrieve, from the remote systems 102, the minimum number of chunks needed to recreate the original object data. The local chunk may be either a data chunk or a parity chunk. However, when the local chunk is a parity chunk, the system typically incurs additional overhead resulting from computing the missing data chunk to be able to reconstruct the object data 202.

In the illustrated example, suppose that the fourth system 102(4) receives a request 602 from the client device 122(N) requesting to access the object 201. In response to receiving the request, the fourth system 102(4) may determine that it has the data chunk 202(B) of the requested object 201, and requires two additional chunks for reconstructing the object data 202. Based on the object metadata 203 that the fourth system 102(4) received with the data chunk 202(B), the fourth system may determine the locations of the other data chunks 202(A) and 202(C), and the parity chunk 202(P) of the object data 202. As one example, the fourth system 102(4) may use the complete object data hash value received with the object metadata 203, and may calculate the modulo (4) of the hash value to determine which of the other systems 102 store which of the other chunks.

Accordingly, to reconstruct the object data with the minimum amount of computational processing, the fourth system 102(4) may retrieve the two other data chunks 202(A) and 202(C) from the systems 102(3) and 102(1), respectively, in the distributed topology 100. As mentioned above, the fourth system 102(4) may determine the location of the two other data chunks based on the hash value included in the object metadata 203 and by applying the modulo(4) operation discussed above for determining which systems 102 maintain the data chunks 202(A) and 202(C) rather than the parity chunk 202(P). Upon receiving the two other data chunks 202(A) and 202(C), the fourth system 102(4) may then simply concatenate the three data chunks 202(A), 202(B), and 202(C) together to recreate the original object data. The fourth system 102(4) may then respond to the request 602 received from the client computing device 122(N) by sending the object 201, including the reconstructed object data 202 and any relevant object metadata 203, such as the object identifier, or the like, to the requesting client computing device 122(N).

On the other hand, suppose that a failure has occurred at the third system 102(3), which results in chunk 202(A) being corrupted, lost, or otherwise unavailable at the time that the request 602 is received. In this situation, the fourth system 102(4) may obtain the parity chunk 202(P) and the third data chunk 202(C) from the second system 102(2) and the first system 102(1), respectively, based on the modulo(4) of the hash value. The fourth system 102(1) may then reconstruct the object data 202 using the second data chunk 202(B), the third data chunk 202(C), and the parity chunk 202(P).

Reconstructing the object data using the parity chunk 202(P) may typically incur a higher computational overhead than if chunk 202(A) were available, as the missing data chunk 202(A) may be first computed using the parity chunk 202(P) and the other two chunks 202(B) and 202(C). Reconstructing the object data 202 using the parity chunk 202(P) as opposed to using the data chunk 202(A) may also typically require more time than retrieving the data chunk 202(A). However, in some cases, the increased computational overhead and time delay may be balanced against system and network latency, network congestion, and the like. For example, it may be the case that the system 102(3) is located some distance geographically from the fourth system 102(4), or over a slow network connection, or over a number of network hops, such that even if the data chunk 202(A) is available, retrieval of the data chunk 202(A) may take longer than computing the data chunk 202(A) using the parity chunk 202(P). Consequently, in such a situation, the fourth system 102(4) may merely retrieve the two chunks that may be retrieved the quickest, and use the parity chunk 202(P) and the two data chunks for reconstructing the object data. In some examples, each system 102 may maintain network latency information for determining whether to use a parity chunk for reconstructing the object data or whether to retrieve a data chunk instead of using the parity chunk.

Figure 7:
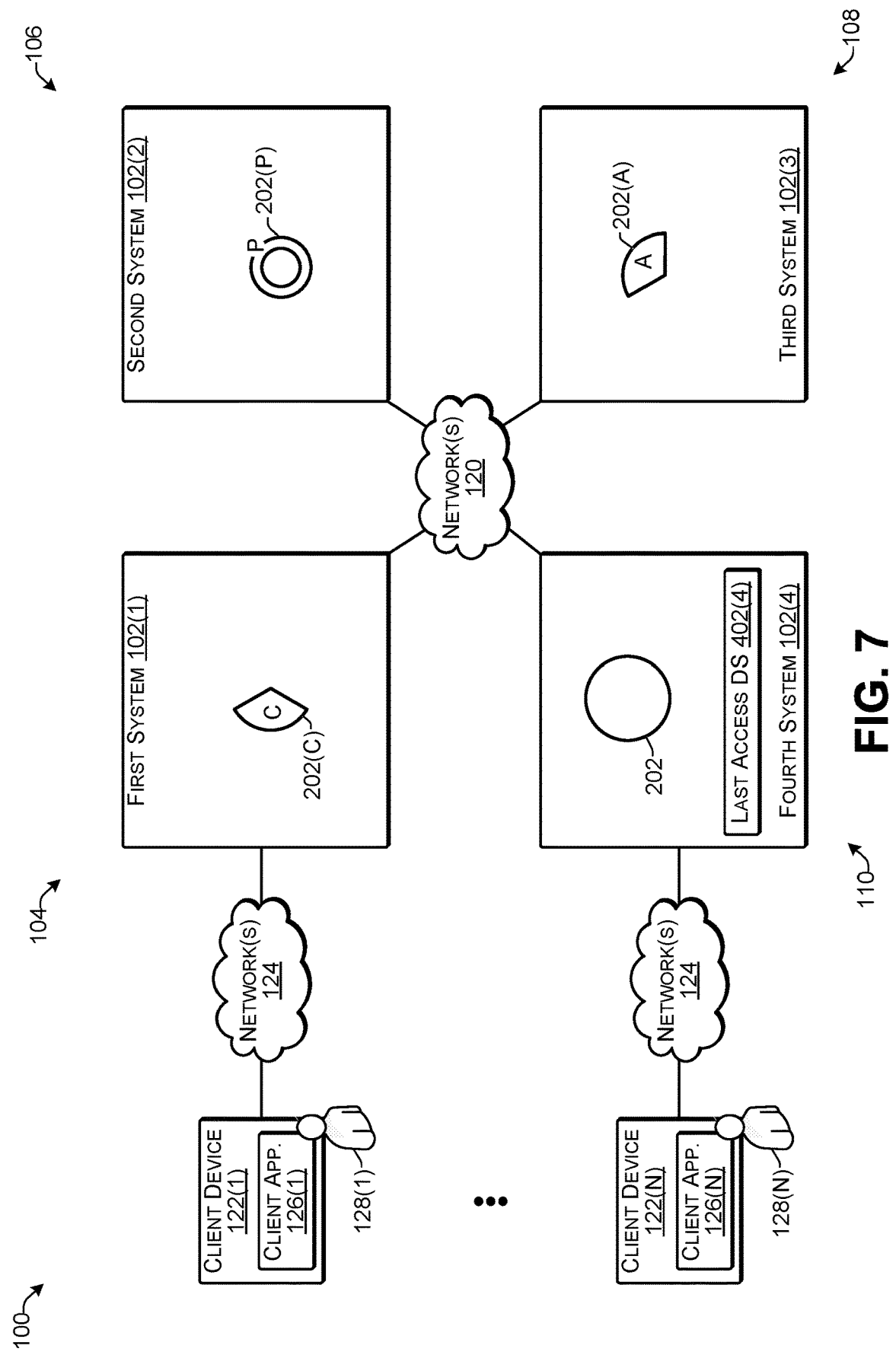
FIG. 7 illustrates an example of maintaining object data based on a time threshold according to some implementations.

FIG. 7 illustrates an example of maintaining a complete instance of the object data following an access to the object according to some implementations. Following the access to the object 201 and the reconstruction of the object data 202, as discussed above with respect to FIG. 6, the fourth system 102(4) may maintain a complete instance of the object data 202 for a threshold time period based on updating an entry (not shown in FIG. 7) in the last access data structure 402(4) for the object. In some examples, the threshold time for maintaining the complete instance of the object data 202 in the fourth system 102(4) may be the same as the threshold time discussed above used by the first system 102(1) in the example of FIG. 4 (i.e., 10 days), while in other examples, a different time threshold may be used based on the settings for the particular fourth system 102(4). As one example, if the fourth system 102(4) has substantially more storage capacity available than the first system 102(1), the default threshold time for the fourth system 102(4) may be longer than that for the first system 102(1).

While the complete instance of the object data 202 is maintained by the fourth system 102(4), the fourth system 102(4) is able to respond immediately to any access requests for the first object. Should such a request be received, the fourth system 102(4) will update the last access time in the last access data structure 402(4) to reflect the most recent access to the object.

Figure 8:
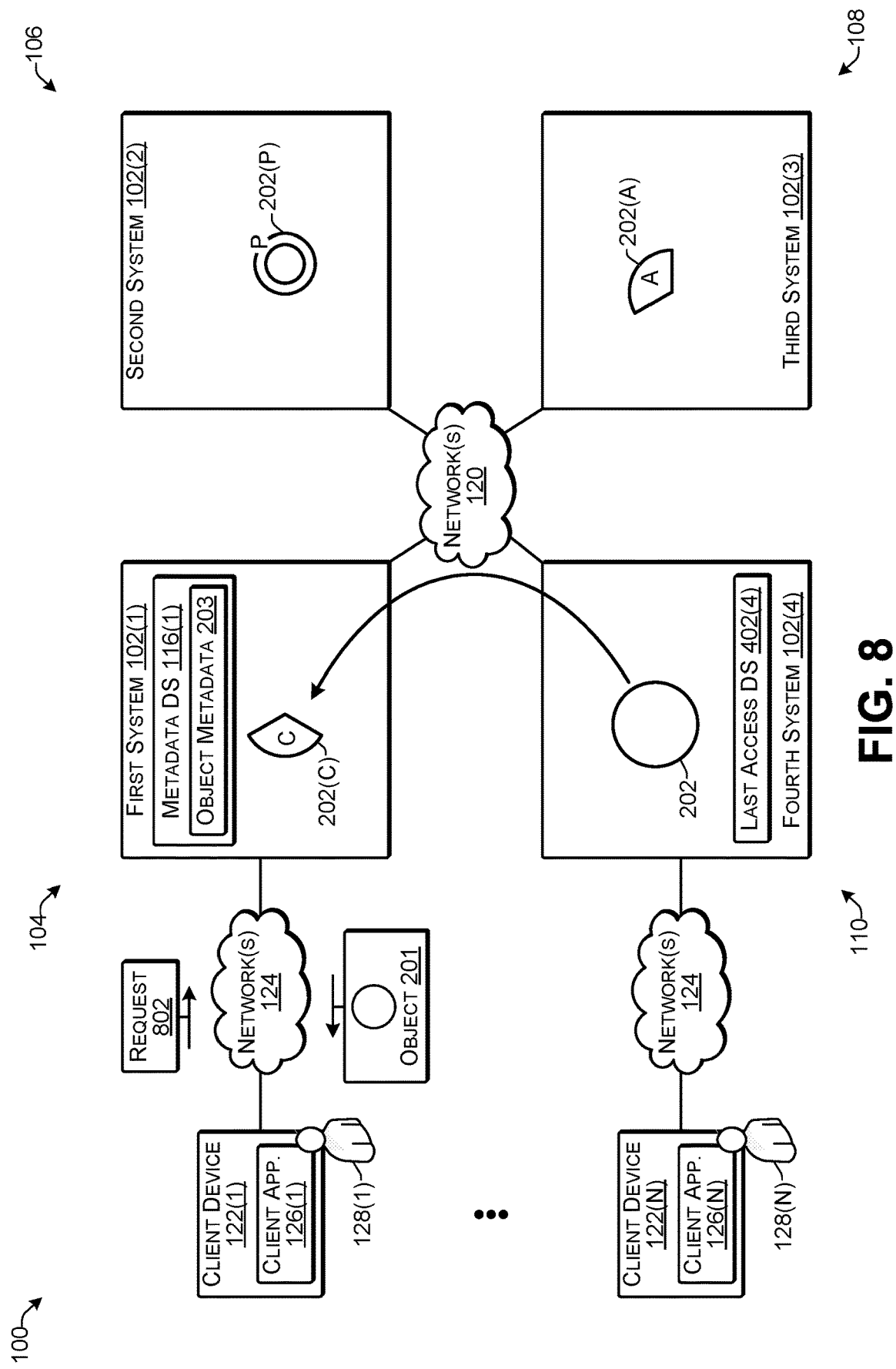
FIG. 8 illustrates an example of receiving a complete instance of object data according to some implementations.

FIG. 8 illustrates an example of retrieving a reconstructed object data for responding to an access request at another system according to some implementations. In this example, suppose that the first system 102(1) receives a request 802 from the client device 122(1) to access the first object 201. In response, the first system 102 1 may determine that it only has the data chunk 202(C) maintained a locally and therefore may use the hash value maintained with the object metadata 203 to determine the location of the other chunks for reconstructing the object data.

In response to communicating a request to the other systems 102 for the other chunks, the fourth system 102(4) may respond with a communication informing the first system 102(1) that the fourth system 102(4) has a complete instance of the object data 202 already reconstructed. Upon receiving this information, the first system 102(1) may cancel requests for the chunks from the second system 102(2) and/or third system 102(3), and may request the complete instance of the object data 202 from the fourth system 102(4). In response, the fourth system 102(4) may send the complete instance of the object data 202 to the first system 102(1) and the first system 102(1) may use the received complete instance of the object data 202 to respond to the request 802 by sending the object 201, including the reconstructed object data 202 and any relevant object metadata 203 to the client device 122(1).

Figure 9:
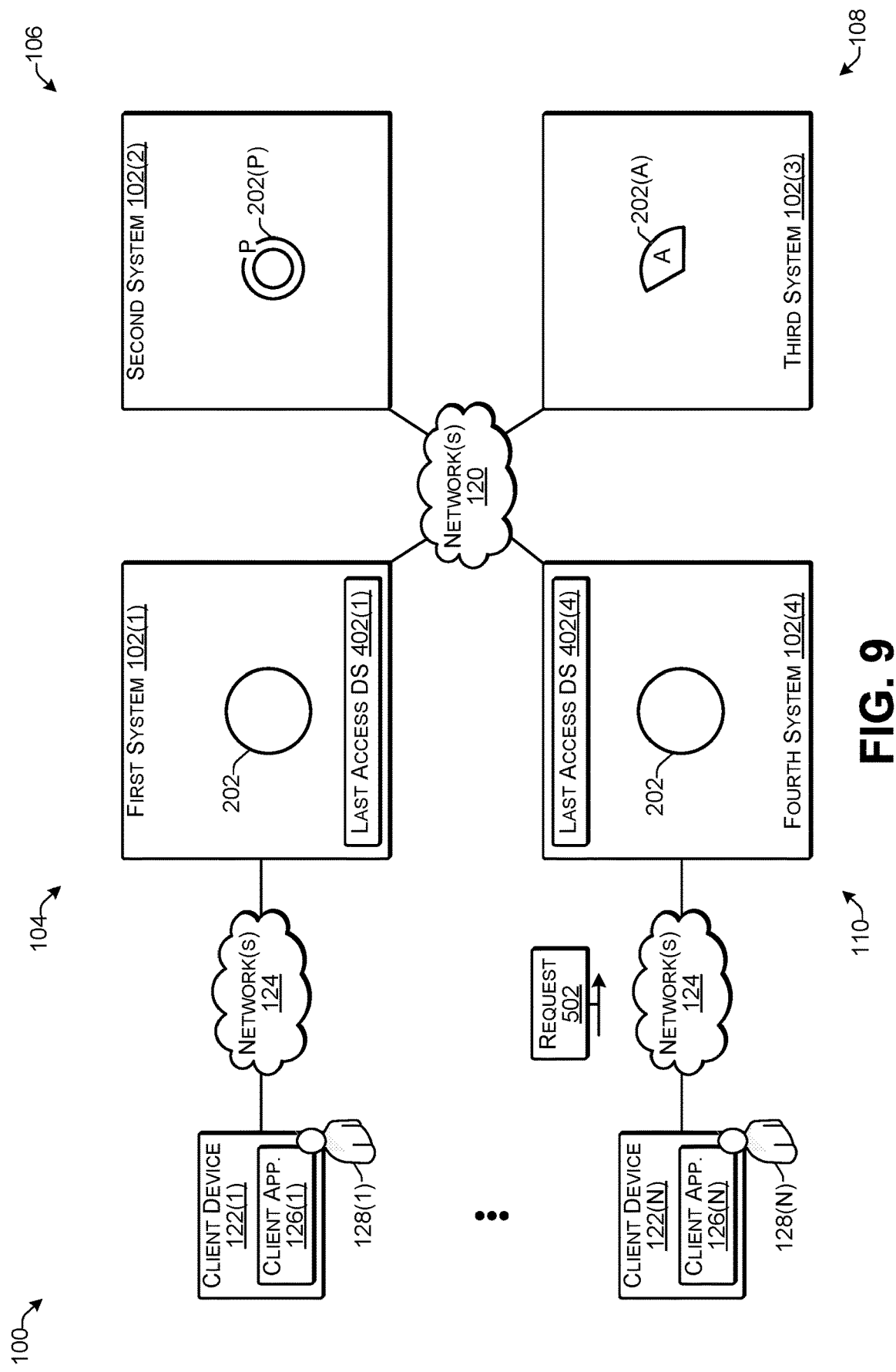
FIG. 9 illustrates an example of maintaining object data based on time thresholds according to some implementations.

FIG. 9 illustrates an example maintaining a complete instance of the object data following an access to the object according to some implementations. Following the access to the object 201, as discussed above with respect to FIG. 8, the first system 102(1) may maintain a complete instance of the object data 202 for the threshold time period based on updating an entry (not shown in FIG. 9) in the last access data structure 402(1) for the object, as discussed above with respect to FIG. 4. Furthermore, in this example, the fourth system 102(4) also still maintains a complete instance of the object data 202. In examples herein, the fourth system 102(4) did not update the last access data structure 402(4) based on sending the copy of the object data 202 to the first system 102(1) since this was not an access by a client device.

While the complete instance of the object data 202 is maintained by the first and fourth systems 102(1) and 102(4), respectively, these systems are able to respond immediately to any access requests for the first object. Should such a request be received, the system receiving the access request will update its own last access time in its respective last access data structure 402 to reflect the most recent access to the object.

Figure 10:
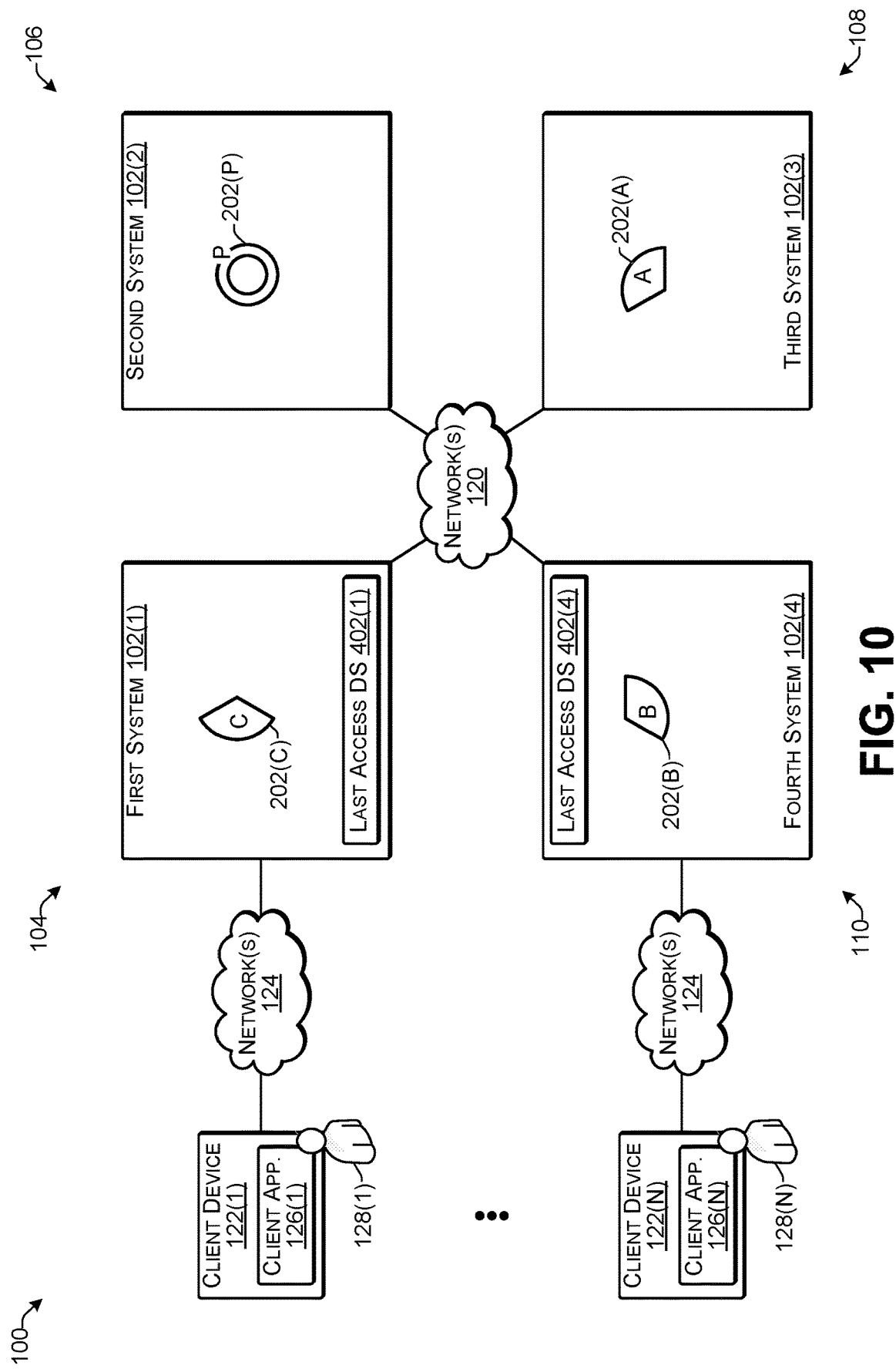
FIG. 10 illustrates an example of reducing object data following expiration of time thresholds according to some implementations.

FIG. 10 illustrates an example an example of reducing object data following expiration of a time threshold according to some implementations. In this example, suppose that no more accesses to the first object have been made since the last access discussed above with respect to FIG. 8. Accordingly, when the time threshold has expired for the first object in the last access data structure 402(4) on the fourth system 102(4), the fourth system 102(4) may determine to reduce the object data 202 (not shown in FIG. 10) to a data chunk. Thus, the fourth system may reduce the complete instance of the object data 202 to the data chunk 202(B) using any of the techniques discussed above with respect to FIG. 5. Similarly, when the time threshold for the first object has expired in the last access data structure 402(1) on the first system 102(1), the first system may reduce the complete instance of the object data 202 to the data chunk 202(C) using any of the techniques discussed above with respect to FIG. 5. Accordingly, FIG. 10 shows that the first system 102(1) now stores only the data chunk 202(C) and the fourth system 102(4) now stores only the data chunk 202(B), and that the complete instance of the object data 202 has been deleted or otherwise marked for deletion in these systems.

Figure 11:
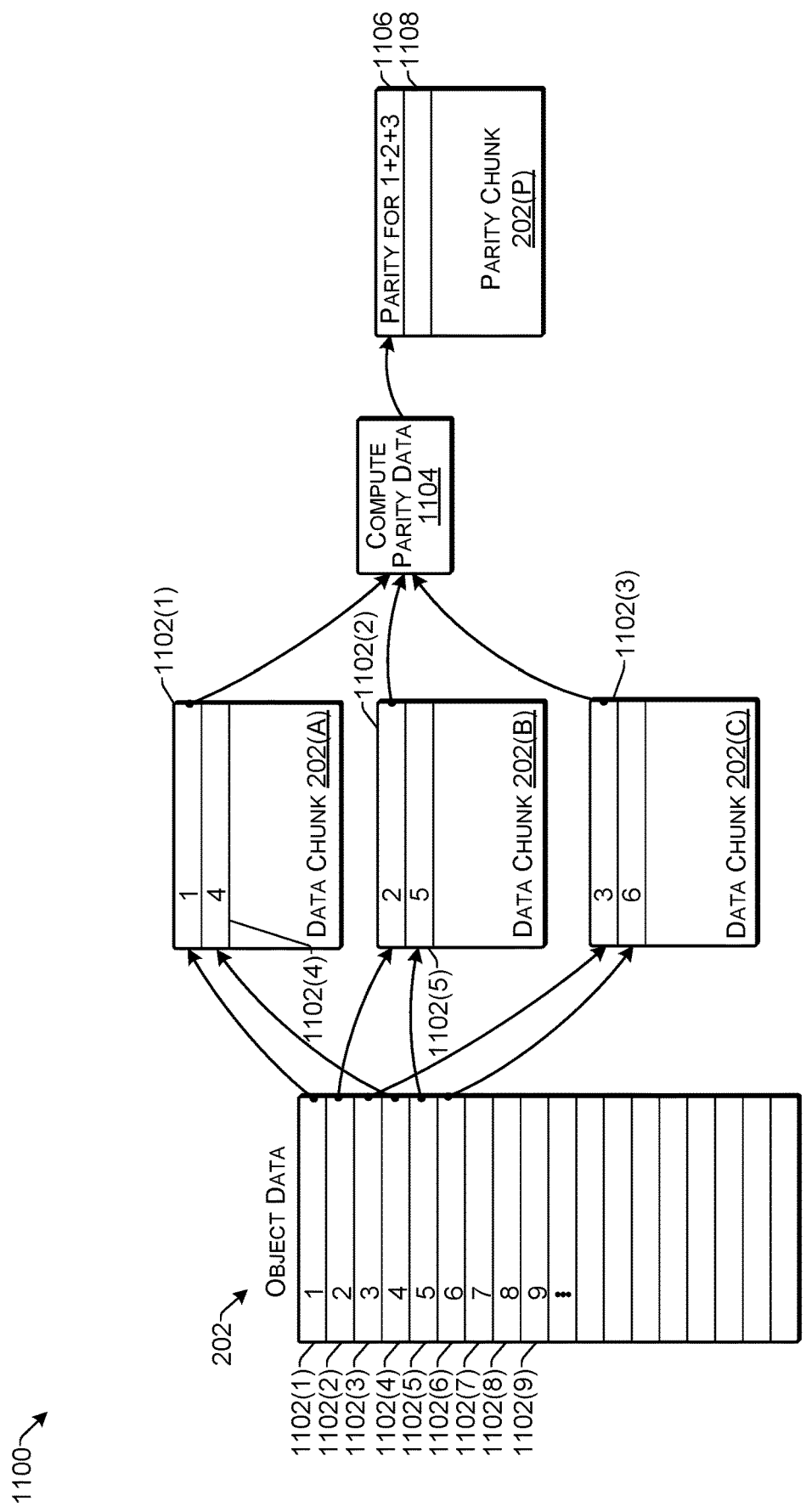
FIG. 11 illustrates an example of determining data chunks and a parity chunk according to some implementations.

FIG. 11 illustrates an example 1100 of determining data chunks and a parity chunk according to some implementations. In some examples, the object data 202 may be merely divided into three equal-sized chunks, as discussed above, such as by starting at the beginning of the data and making the first chunk from the first one third of the data, the second chunk from the second one third of the data, and the third chunk from the third one third of the data, and then calculating the parity from these three chunks.

In this example, however, the data chunks are created by interleaving blocks of the object data. Thus, initially, the object data 202 may be divided into a plurality of equally-sized blocks 1102 before dividing the object data 202 into chunks. For example, the block size may be any desired block size such as 256 bytes, 512 bytes, 1024 bytes, etc. As one example, the block size may be based on the size of the object data. For example, a very large data object may be divided into larger blocks while a smaller data object may be divided into smaller block sizes.

As illustrated, the object data 202 has a first block 1102(1), a second block 1102(2), a third block 1102(3), a fourth block 1102(4), a fifth block 1102(5), a sixth 1102(6), a seventh block 1102(7), an eighth block 1102(8), a ninth block 1102(9), and so forth. When creating the data chunks, in the sequence starting with the first block, the blocks are alternately added to the plurality of data chunks. Thus, the first block 1102(1) is added to the beginning of the first data chunk 202(A), the second block 1102(2) is added to the beginning of the second data chunk 202(B), and the third block 1102(3) is added to the beginning of the third data chunk 202(C). Next, the fourth block 1102(4) is added to the first data chunk 202(A) in a position following the first block 1102(1), the fifth block 1102(5) is added to the second data chunk 202(B) in a position following the second block 1102(2), and the sixth block 1102(6) is added to the third data chunk 202(C) in a position following the third block 1102(3). The process may continue until all the blocks 1102 in the object data 202 have been distributed to the data chunks 202(A)-202(C).

When calculating the parity chunk 202(P) for the three data chunks 202(A)-202(C), the system may perform the parity calculation using the interleaved blocks. Thus, as indicated at 1104, the system may calculate parity for the first data block 1102(1) from the first data chunk 202(A), the second data block 1102(2) from the second data chunk 202(B), and the third data block 1102(3) from the third data chunk 202(C) for computing a first parity block 1106. Accordingly, the parity block 1106 includes parity data for the first three blocks 1102(1)-1102(3) of the object data 202. The calculation of the parity chunk 202(P) may continue in this manner by next selecting the data blocks 1102(4)-1102(6) for calculating the next parity block 1108, and so forth.

By configuring the data chunks in this interleaved manner and determining the parity chunk based on the interleaved data, then, when reconstructing object data using a parity chunk, it is possible to reconstruct a missing chunk using the parity chunk and also concatenate the reconstructed data with the data from the other two chunks in a single pass, since the blocks are small enough to maintain in memory during use of the parity data to recreate the missing chunk data and concatenation of the recreated data with the data from the blocks of the other data chunks. On the other hand, using the first technique discussed above of creating data chunks by just dividing the object data 202 into thirds may result in two passes being required when recreating missing data from parity data, i.e., one pass to compute the missing data from the parity data and store the computed data to a storage location, and a second pass to concatenate the recreated data with the data from the other chunks. Furthermore, while several examples of techniques for dividing the data into chunks and calculating the parity chunk have been described herein, numerous other variations will be apparent to those of skill in the art having the benefit of the disclosure herein.

Figure 12:
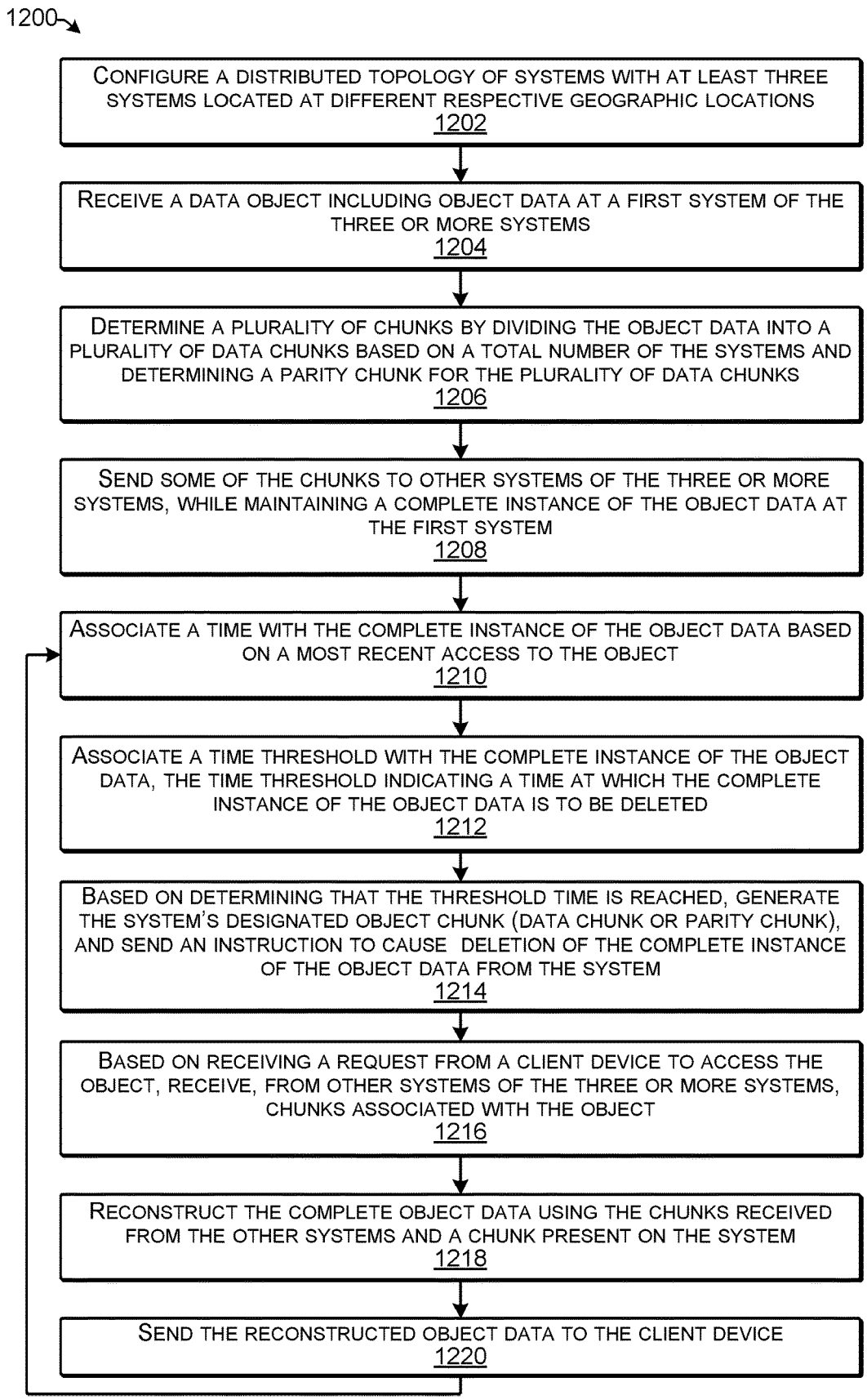
FIG. 12 is a flow diagram illustrating an example process for managing object data according to some implementations.

FIG. 12 is a flow diagram illustrating an example process according to some implementations. The process is illustrated as a collection of blocks in a logical flow diagram, which represents a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the process is described with reference to the environments, frameworks, and systems described in the examples herein, although the process may be implemented in a wide variety of other environments, frameworks, and systems.

FIG. 12 is a flow diagram illustrating an example process 1200 for managing object data according to some implementations. In some cases, the process 1200 may be executed at least in part by the service computing device(s) 112 or other suitable computing device(s).

At 1202, the computing device may configure a distributed topology of systems with at least three systems located at different respective geographic locations. For example, the systems may be located in different cities, different states, different countries, or may be otherwise located in different geographic regions.

At 1204, the computing device may receive a data object at a first system of the three or more systems, the data object including object data and object metadata.

At 1206, the computing device may determine a plurality of chunks by dividing the object data into a plurality of data chunks based on a total number of the systems and determining a parity chunk for the plurality of data chunks.

At 1208, the computing device may send some of the chunks to other systems of the three or more systems, while maintaining a complete instance of the object data at the first system.

At 1210, the computing device may associate a time with the complete instance of the object data based on a most recent access to the object.

At 1212, the computing device may associate a time threshold with the complete instance of the object data, the time threshold indicating a time at which the complete instance of the object data is to be deleted.

At 1214, based on determining that the threshold time is reached, the computing device may generate the system's designated object chunk (data chunk or parity chunk), and send an instruction to cause deletion of the complete instance of the object data from the system. For example, before deleting the complete instance of the object data from the system, the system may generate the system's object chunk from the complete instance. Thus, if the system is designated for storing one of the data chunks for the object, the system may generate the designated data chunk from the complete instance. Similarly, if the system is designated for storing the parity chunk, the system may generate the parity chunk from the complete instance. Following generation of the system's object chunk, the system may then delete or otherwise send an instruction to cause deletion of the complete instance of the object data.

At 1216, based on receiving a request from a client device to access the object, the computing device may receive, from other systems of the three or more systems, chunks associated with the object.

At 1218, the computing device may reconstruct the complete object data using the chunks received from the other systems and a chunk present on the system.

At 1220, the computing device may send the reconstructed object data to the client device. Further, the computing device may set a last access time for the reconstructed complete instance of the object data and may associate a time threshold with the complete instance by returning to block 1210.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 13:
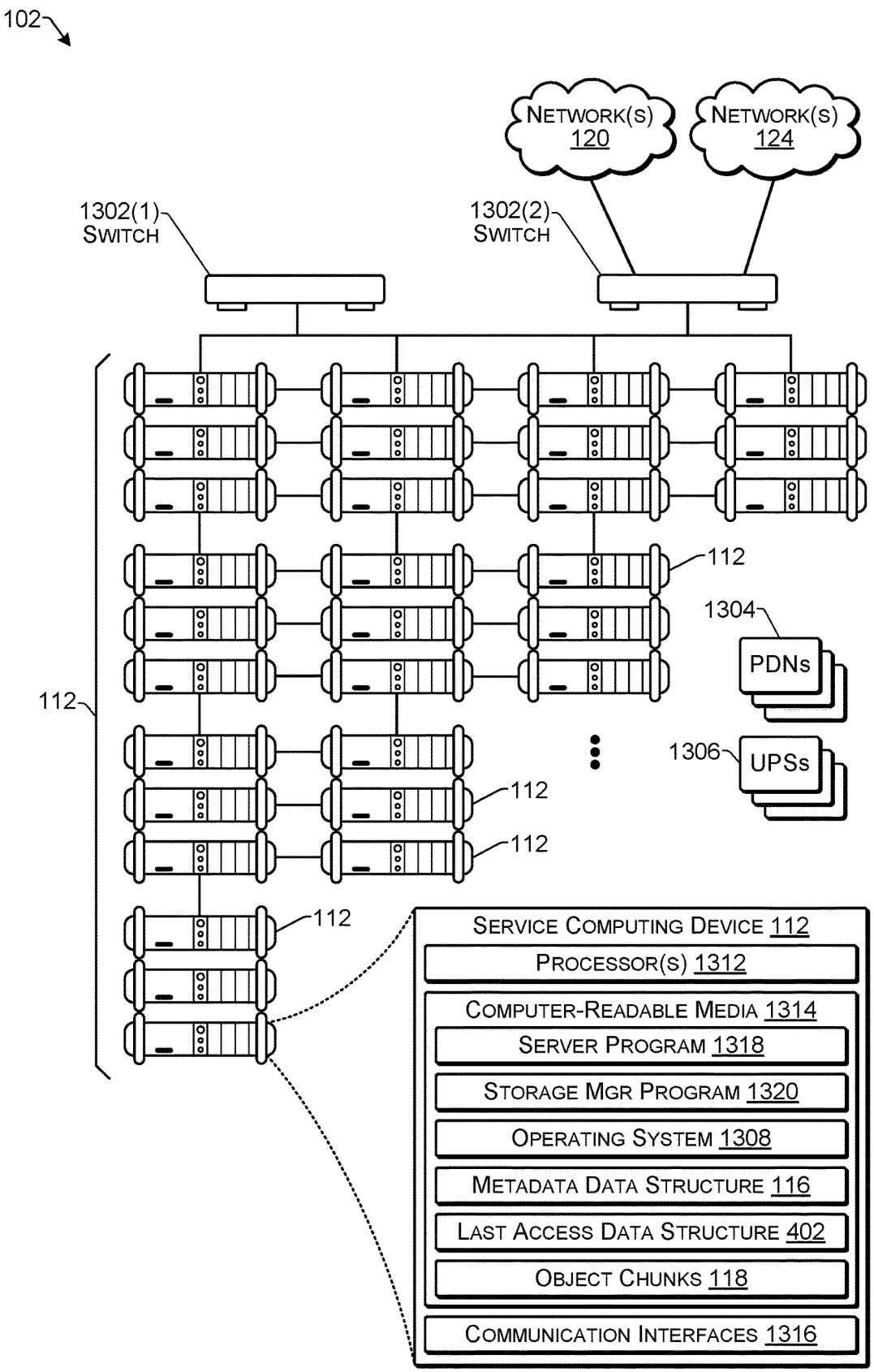
FIG. 13 illustrates an example configuration of a computing system according to some implementations.

FIG. 13 illustrates an example configuration of a computing system 102 according to some implementations. In this example, the computing system 102 may be a cluster or other plurality of service computing devices 112 (also referred to as nodes herein) configured to be able to perform the functions of an object storage system as described herein. In some examples, the computing system 102 may be referred to as a redundant array of independent nodes (RAIN) that are networked together. In the illustrated example, a plurality of the service computing devices 112 are in communication with a pair of network switches 1302. The network switches 1302 may comprise a first switch 1302(1) that serves as an internal switch to enable peer-to-peer communication between service computing devices 112, and a second switch 1302(2) that serves as an external switch to enable external access to the service computing devices 112. Each switch 1302 may include enough ports to handle all potential service computing devices 112 in a cluster or other computing system configuration.

The computing system 102 in this example may also include power distribution units (PDUs) 1304 and uninterruptible power supplies (UPSs) 1306. The PDUs 1304 are used to power the service computing devices 112 and switches 1302, and the UPSs 1306 may protect the nodes and switches in case of power fluctuations and/or failures. As mentioned above, the computing system 102 may be connected to a network, such as the one or more networks 120 and 124 discussed above, which may include the Internet or other WAN, a LAN, or other types of networks, as enumerated elsewhere herein.

The service computing devices 112 may be homogeneous or heterogeneous. A typical service computing device 112 may execute an operating system 1308, such as LINUX®, WINDOWS®, or the like. Additionally, some or all of the service computing devices 112 may include or may access one or more hard disk drives (HDDs) and/or one or more solid-state drives (SSDs) for storing object data and/or system data, as discussed additionally below. As one example, the service computing devices 112 may include one or more servers or other types of computing devices that may be embodied in any number of ways. For instance, in the case of a server, the modules, other functional components, and at least a portion of data storage may be implemented on at least one server, such as in a cluster of servers, a server farm or data center, a cloud-hosted computing service, and so forth, although other computer architectures may additionally or alternatively be used.

In the illustrated example, an example service computing device 112 includes, or may have associated therewith, one or more processors 1312, one or more computer-readable media 1314, and one or more communication interfaces 1316. Each processor 1312 may be a single processing unit or a number of processing units, and may include single or multiple computing units or multiple processing cores. The processor(s) 1312 can be implemented as one or more central processing units, microprocessors, microcomputers, microcontrollers, digital signal processors, state machines, logic circuitries, graphics processing units, and/or any devices that manipulate signals based on operational instructions. For instance, the processor(s) 1312 may be one or more hardware processors and/or logic circuits of any suitable type specifically programmed or configured to execute the algorithms and processes described herein. The processor(s) 1312 can be configured to fetch and execute computer-readable instructions stored in the computer-readable media 1314, and these instructions can program the processor(s) 1312 to perform the functions described herein.

In some cases, the computer-readable media 1314 may include at least a portion of the storage devices 114 discussed above with respect to FIG. 1. The storage devices may include SSDs and/or HDDs or the like. Further, the computer-readable media 1314 may include volatile and nonvolatile memory and/or removable and non-removable media implemented in any type of technology for storage of information, such as computer-readable instructions, data structures, program modules, or other data. Accordingly, the computer-readable media 1314 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the node 102, the computer-readable media 1314 may be a tangible non-transitory medium to the extent that, when mentioned, non-transitory computer-readable media exclude media such as energy, carrier signals, electromagnetic waves, and/or signals per se.

The computer-readable media 1314 may be used to store any number of functional components that are executable by the processor(s) 1312. In many implementations, these functional components may be one or more computer programs, applications, or portions thereof, executable code, or other executable instructions that are executable by the processor(s) 1312 and that, when executed, specifically program the processor(s) 1312 to perform the actions attributed herein to the service computing device(s) 112. Functional components stored in the computer-readable media 1314 may include a server program 1318 that may communicate with the client devices such as for sending data objects to the client devices and receiving data objects from the client devices. The functional components may further include a storage manager program 1320, which may perform the erasure coding and storage management algorithms discussed herein, such as for dividing objects into chunks, determining parity chunks, and distributing the chunks to other systems in a distributed topology based on assigned roles. Additional functional components stored in the computer-readable media 1314 may include the operating system 1308 for controlling and managing various functions of the service computing devices 112. As one example, these functional components may be stored in a storage portion of the computer-readable media 1314, loaded into a local memory portion of the computer-readable media 1314, and executed by the one or more processors 1312.

In addition, the computer-readable media 1314 may store data and data structures used for performing the functions and services described herein. For example, the computer-readable media 1314 may store the metadata data structure 116 for maintaining metadata about the object chunks 118 stored by the system 102. The computer-readable media 1314 may also store the last access data structure 402 that may be used for managing how long complete copies of object data are maintain on the system 102. In addition, the computer-readable media 1314 may store the object chunks 118. The service computing devices 112 may also include or maintain other functional components and data, which may include programs, drivers, etc., and the data used or generated by the functional components. Further, the service computing devices 112 may include many other logical, programmatic, and physical components, of which those described above are merely examples that are related to the discussion herein.

The communication interface(s) 1316 may include one or more interfaces and hardware components for enabling communication with various other devices, such as over the network(s) 120 and 124 discussed above. For example, communication interface(s) 1316 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein. Further, the example of the computing system 102 described above is but one example of a computing system 102 suitable for use as an object storage system that may perform the functions described in the examples herein.

Figure 14:
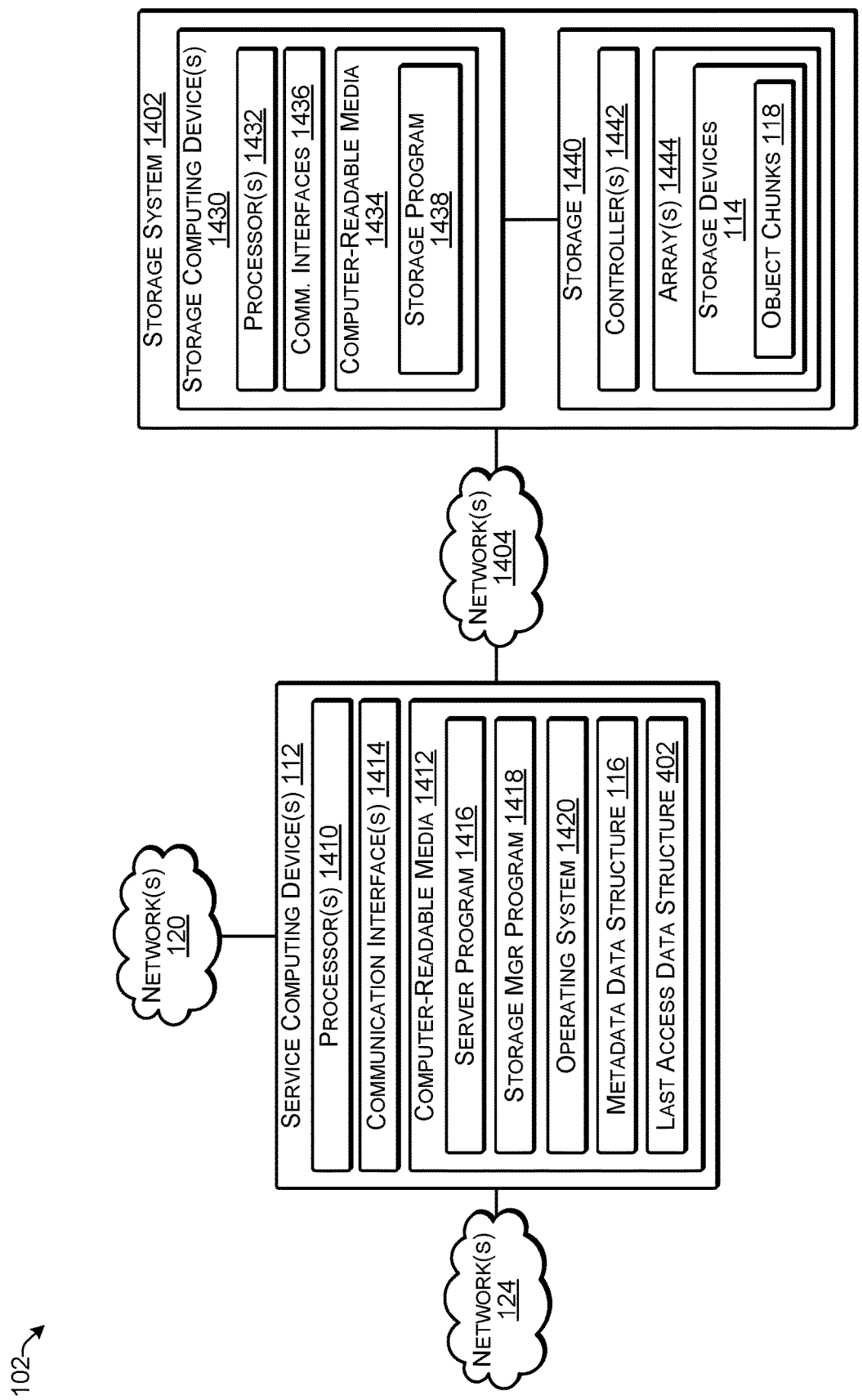
FIG. 14 illustrates an example configuration of a computing system according to some implementations.

FIG. 14 illustrates another example configuration of a computing system 102 according to some implementations. The system 102 includes a least one service computing device 112 that is able to communicate with, or is otherwise coupled to, a storage system 1402, such as through one or more networks 1404. Typically, the one or more networks 1404 may include a LAN, a storage area network (SAN), such as a Fibre Channel network, or the like, but are not limited to such, and may include other types of networks as discussed herein, a direct connection, or the like.

In some examples, the at least one service computing device 112 may include one or more servers or other types of computing devices that may be embodied in any number of ways. For instance, in the case of a server, the programs, other functional components, and at least a portion of data storage may be implemented on at least one server, such as in a plurality of servers, a server farm, a data center, a cloud-hosted computing service, and so forth, although other computer architectures may additionally or alternatively be used. In the illustrated example, the service computing device 112 includes, or may have associated therewith, one or more processors 1410, one or more computer-readable media 1412, and one or more communication interfaces 1414.

Each processor 1410 may be a single processing unit or a number of processing units, and may include single or multiple computing units, or multiple processing cores. The processor(s) 1410 can be implemented as one or more central processing units, microprocessors, microcomputers, microcontrollers, digital signal processors, state machines, logic circuitries, graphics processors, and/or any devices that manipulate signals based on operational instructions. As one example, the processor(s) 1410 may include one or more hardware processors and/or logic circuits of any suitable type specifically programmed or configured to execute the algorithms and processes described herein. The processor(s) 1410 may be configured to fetch and execute computer-readable instructions stored in the computer-readable media 1412, which may be executed to program the processor(s) 1410 to perform the functions described herein.

The computer-readable media 1412 may include volatile and nonvolatile memory and/or removable and non-removable media implemented in any type of technology for storage of information, such as computer-readable instructions, data structures, program modules, or other data. For example, the computer-readable media 1412 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 112, the computer-readable media 1412 may be a tangible non-transitory medium to the extent that, when mentioned, non-transitory computer-readable media exclude media such as energy, carrier signals, electromagnetic waves, and/or signals per se. In some cases, the computer-readable media 1412 may be at the same location as the service computing device 112, while in other examples, the computer-readable media 1412 may be partially remote from the service computing device 112. For instance, in some cases, the computer-readable media 1412 may include a portion of storage in the storage system 1402.

The computer-readable media 1412 may be used to store any number of functional components that are executable by the processor(s) 1410. In many implementations, these functional components comprise instructions or programs that are executable by the processor(s) 1410 and that, when executed, specifically program the processor(s) 1410 to perform the actions attributed herein to the service computing device 112. Functional components stored in the computer-readable media 1412 may include a server program 1416 and a storage manager program 1418, each of which may include one or more computer programs, applications, or portions thereof, executable code, or other executable instructions. For example, the server program 1416 may provide communication functionality with the client devices and the storage system 1402. The storage manager program 1418 may include a database management function for creating and managing the metadata data structure 116 containing object metadata, or the like, corresponding to object data, including the object chunks 118, stored at the storage system 1402. The storage manager program 1418 may further perform the functions of dividing objects into chunks, erasure coding the chunks, distributing the chunks, and reconstructing the object data from the chunks. Additional functional components stored in the computer-readable media 1412 may include an operating system 1420 for controlling and managing various functions of the service computing device 112. In some cases, the functional components may be stored in a storage portion of the computer-readable media 1412, loaded into a local memory portion of the computer-readable media 1412, and executed by the one or more processors 1410.

In addition, the computer-readable media 1412 may store data and data structures used for performing the functions and services described herein. For example, the computer-readable media 1412 may store the metadata data structure 116 and the fingerprint data structure 1004. The service computing device 112 may also include or maintain other functional components and data, which may include programs, drivers, etc., and the data used or generated by the functional components. Further, the service computing device 112 may include many other logical, programmatic, and physical components, of which those described above are merely examples that are related to the discussion herein.

The communication interface(s) 1414 may include one or more interfaces and hardware components for enabling communication with various other devices, such as over the one or more network(s) 120, 124 and 1404. Thus, the communication interfaces 1414 may include, or may couple to, one or more ports that provide connection for communicating with the storage system 1402, and one or more ports that provide connection to the network(s) 120 for communication with the client devices 108. For example, the communication interface(s) 1414 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

The storage system 1402 may include one or more storage computing devices 1430, which may include one or more servers or any other suitable computing device, such as any of the examples discussed above with respect to the service computing device 112. The storage computing device(s) 1430 may each include one or more processors 1432, one or more computer-readable media 1434, and one or more communication interfaces 1436. For example, the processors 1432 may correspond to any of the examples discussed above with respect to the processors 1410, the computer-readable media 1434 may correspond to any of the examples discussed above with respect to the computer-readable media 1412, and the communication interfaces 1436 may correspond to any of the examples discussed above with respect to the communication interfaces 1414.

In addition, the computer-readable media 1434 may include a storage program 1438 as a functional component executed by the one or more processors 1432 for managing the storage of data on a storage 1440 included in the storage system 1402. The storage 1440 may include one or more controllers 1442 associated with the storage 1440 for storing data on one or more arrays 1444 of storage devices 114. For instance, the controller 1442 may control the arrays 1444, such as for configuring the arrays 1444 in a RAID configuration, or any other suitable storage configuration, and/or for presenting logical units based on the storage devices 114 to the storage program 1438, and for managing data, such as data objects 118, stored on the underlying physical storage devices 114. The storage devices 114 may be any type of storage device, such as hard disk drives, solid state drives, optical drives, magnetic tape, combinations thereof, and so forth. Additionally, while several example systems have been described, numerous other systems able to implement the distributed object storage, erasure coding, and data management techniques herein will be apparent to those of skill in the art having the benefit of the disclosure herein.

Various instructions, processes, and techniques described herein may be considered in the general context of computer-executable instructions, such as program modules stored on computer-readable media, and executed by the processor(s) herein. Generally, program modules include routines, programs, objects, components, data structures, executable code, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
one or more processors; and
one or more non-transitory computer-readable media maintaining executable instructions, which, when executed by the one or more processors, configure the one or more processors to perform operations comprising:
receiving at the system, from a client device, a data object including object data and object metadata, wherein the system is a first system of three or more systems, each system located at a different respective geographic location;
determining a plurality of chunks by dividing the object data into a plurality of data chunks based on a total number of the different respective geographic locations across which the data object is to be distributed, each data chunk of the plurality of data chunks containing a different portion of the object data of the data object, and determining a parity chunk for the plurality of data chunks;
sending some of the chunks to other systems of the three or more systems, while maintaining a complete instance of the object data at the first system;
sending, to the other systems and in association with each chunk sent to each of the other systems, metadata including at least a portion of the object metadata received with the data object from the client device and a value generated from content of the complete instance of the data object, wherein the value generated from the content of the complete instance of the data object enables the other systems to determine respective systems of the three or more systems at which the chunks of the data object are located; and
associating a time threshold with the complete instance of the object data, wherein the time threshold indicates a time at which the complete instance of the object data is indicated to be ready for deletion,
wherein, following deletion of the complete instance of the object data, the object data of the data object remains stored across the three or more systems located at the different respective geographic locations in a geographically distributed manner so that each system of the three or more systems includes either a different portion of the object data or the parity chunk.

2. The system as recited in claim 1, the operations further comprising:
determining that the time threshold is reached; and
sending an instruction causing deletion of the complete instance of the object data from the system.

3. The system as recited in claim 2, the operations further comprising:
prior to deleting the complete instance of the object data, determining at least one of a data chunk or a parity chunk from the complete instance of the object data; and
maintaining one of the data chunk or the parity chunk at the system.

4. The system as recited in claim 2, the operations further comprising:
receiving, at the system, from a client device, a request to access the data object;
in response to the request from the client device, requesting, from other systems of the three or more systems, chunks associated with the data object;
in response to the request from the client, and following receipt of the chunks from the other systems of the three or more systems, reconstructing the complete object data using the chunks received from the other systems and a chunk present on the system; and
sending, to the client device, at least a portion of the reconstructed complete object data.

5. The system as recited in claim 4, the operations further comprising:
updating a data structure to indicate a time associated with the request to access the data object, wherein each system of the three or more systems maintains a respective data structure indicating a last time the data object was accessed on that system by a client device;
associating the time threshold with the reconstructed complete object data; and
maintaining the reconstructed complete object data on the system, the time threshold indicating when the reconstructed complete object data is to be ready for deletion.

6. The system as recited in claim 4, the operations further comprising "
determining that the time threshold associated with the reconstructed complete object data has been reached; and
indicating that the reconstructed object data is to be deleted from the system.

7. The system as recited in claim 1, wherein a duration of the time threshold is different from a duration of another time threshold for another instance of complete object data that the system stores for a different data object.

8. The system as recited in claim 1, wherein associating the time with the instance of complete object data based on receiving the data object includes updating a time of last access for the complete object data in a data structure.

9. The system as recited in claim 1, wherein the threshold time is a specified period of time applied by default to complete instances of object data maintained on the system.

10. The system as recited in claim 1, wherein sending some of the chunks to other systems of the three or more systems comprises:
determining the value generated from the content of the complete instance of the object data;
determining a respective role value corresponding to each of the systems; and
sending respective ones of the chunks to respective ones of the systems based on the respective role values and the value generated from the content of the complete instance of the object data.

11. The system as recited in claim 10, wherein the operation of sending respective ones of the chunks to respective ones of the systems based on the respective role values and the value generated from the content of the complete instance of the object data further comprises:
determining, using a hashing algorithm, a hash value from the object data as the value generated from the content;
determining a result of a modulo operation on the hash value, wherein the modulo operation is based on the total number of the systems; and
determining the respective systems to receive the respective chunks based on the result of the modulo operation and the respective role values.

12. The system as recited in claim 1, the operations further comprising:
receiving, at the system, from a client device, a request to access another data object;
receiving, from another one of the systems of the three or more systems, reconstructed complete object data for the other data object; and
sending, to the client device, at least a portion of the reconstructed complete object data of the other data object.

13. The system as recited in claim 12, the operations further comprising:
maintaining the reconstructed complete instance of the object data until a threshold time has elapsed;
determining, based on a value generated from the content of the complete instance of the other data object stored with metadata for the other data object, whether to maintain a parity chunk or a particular data chunk for the other data object at the system;
generating based on the value generated from the content of the complete instance of the other data object, the determined particular data chunk or the parity chunk from the reconstructed complete instance; and
sending an instruction to cause deletion of the reconstructed complete instance.

14. A method comprising:
receiving, by one or more processors of a system, from a client device, a data object including object data, wherein the system is a first system of three or more systems, each system located at a different respective geographic location;
determining, by the one or more processors, a plurality of chunks by dividing the object data into a plurality of data chunks based on a total number of the different respective geographic locations across which the data object is to be distributed, each data chunk of the plurality of data chunks containing a different portion of the object data of the data object, and determining a parity chunk for the plurality of data chunks;
sending, by the one or more processors, some of the chunks to other systems of the three or more systems, while maintaining a complete instance of the object data at the first system;
sending, to the other systems and in association with each chunk sent to each of the other systems, metadata including a value generated from content of the complete instance of the data object, wherein the value generated from the content of the complete instance of the data object enables the other systems to determine respective systems of the three or more systems at which the chunks of the data object are located; and associating, by the one or more processors, a time threshold with the complete instance of the object data, wherein the time threshold indicates a time at which the complete instance of the object data is indicated to be ready for deletion,
wherein, following deletion of the complete instance of the object data, the object data of the data object remains stored across the three or more systems located at the different respective geographic locations in a geographically distributed manner so that each system of the three or more systems includes either a different portion of the object data or the parity chunk.

15. One or more non-transitory computer-readable media storing instructions that, when executed by one or more processors, program the one or more processors of a system to perform operations comprising:
receiving a data object at the system, the data object including object data, wherein the system is a first system of three or more systems, each system located at a different respective geographic location;
determining a plurality of chunks by dividing the object data into a plurality of data chunks based on a total number of the different respective geographic locations across which the data object is to be distributed, each data chunk of the plurality of data chunks containing a different portion of the object data of the data object, and determining a parity chunk for the plurality of data chunks;
sending some of the chunks to other systems of the three or more systems, while maintaining a complete instance of the object data at the first system;
sending, to the other systems and in association with each chunk sent to each of the other systems, metadata including a value generated from content of the complete instance of the data object, wherein the value generated from the content of the complete instance of the data object enables the other systems to determine respective systems of the three or more systems at which the chunks of the data object are located; and
associating a time threshold with the complete instance of the object data, wherein the time threshold indicates a time at which the complete instance of the object data is indicated to be ready for deletion,
wherein, following deletion of the complete instance of the object data, the object data of the data object remains stored across the three or more systems located at the different respective geographic locations in a geographically distributed manner so that each system of the three or more systems includes either a different portion of the object data or the parity chunk.

16. The one or more non-transitory computer-readable media as recited in claim 15, the operations further comprising:
prior to deleting the complete instance of the object data, determining at least one of a data chunk or a parity chunk from the complete instance of the object data; and
maintaining one of the data chunk or the parity chunk at the system.

17. The one or more non-transitory computer-readable media as recited in claim 15, the operations further comprising:
receiving, at the system, from a client device, a request to access the data object;
receiving, from other systems of the three or more systems, chunks associated with the data object;

reconstructing the complete object data using the chunks received from the other systems and a chunk present on the system; and sending, to the client device, at least a portion of the reconstructed complete object data.

18. The method as recited in claim 14, further comprising:

prior to deleting the complete instance of the object data, determining at least one of a data chunk or a parity chunk from the complete instance of the object data; and maintaining one of the data chunk or the parity chunk at the system.

19. The method as recited in claim 14, further comprising:

receiving, at the system, from a client device, a request to access the data object;

receiving, from other systems of the three or more systems, chunks associated with the data object;

reconstructing the complete object data using the chunks received from the other systems and a chunk present on the system; and sending, to the client device, at least a portion of the reconstructed complete object data.

20. The method as recited in claim 19, further comprising:

updating a data structure to indicate a time associated with the request to access the data object, wherein each system of the three or more systems maintains a respective data structure indicating a last time the data object was accessed on that system by a client device;

associating the time threshold with the reconstructed complete object data; and maintaining the reconstructed complete object data on the system, the time threshold indicating when the reconstructed complete object data is to be ready for deletion.

* * * * *